United States Patent [19]
Morgan

[11] 3,810,310
[45] May 14, 1974

[54] MICROMETER MEASURING DEVICES

[75] Inventor: Paul A. Morgan, Chicago, Ill.

[73] Assignee: Century Wheels Inc., Lake Bluff, Ill.

[22] Filed: Mar. 27, 1972

[21] Appl. No.: 238,340

[52] U.S. Cl............... 33/166, 33/164 R, 40/86 R, 74/441
[51] Int. Cl. .......................................... G01b 3/18
[58] Field of Search ............ 33/166, 164, 165, 163, 33/354; 74/441

[56] References Cited
UNITED STATES PATENTS

| 2,856,694 | 10/1958 | Bianco | 33/164 R |
|---|---|---|---|
| 2,493,000 | 1/1950 | Linsley | 74/441 |
| 2,567,483 | 9/1951 | Hotine | 33/164 R |
| 2,691,224 | 10/1954 | Thielicke | 33/166 |
| 1,208,824 | 12/1916 | Paulsen | 33/354 |
| 3,667,127 | 6/1972 | Tsugami | 33/166 |
| 1,444,565 | 2/1923 | Smith | 33/166 |

Primary Examiner—William D. Martin, Jr.
Attorney, Agent, or Firm—Sheldon I. Landsman

[57] ABSTRACT

A micrometer comprises a frame having a first reference means, a spindle mounted in the frame for axial movement and having a threaded section, a control nut extending partially around a longitudinal portion of the threaded section of the spindle and having threads mating with those of the spindle, and means for positioning the control nut at a set longitudinal distance from the first reference means. Resilient force applying means acts transverse to the axis of the spindle to continuously urge the mating threads of the spindle and control nut into tight engagement with each other to maintain the roots and crests of the spindle in continuous alignment with the roots and crests of the control nut and provide for accurate readings of the micrometer.

49 Claims, 34 Drawing Figures

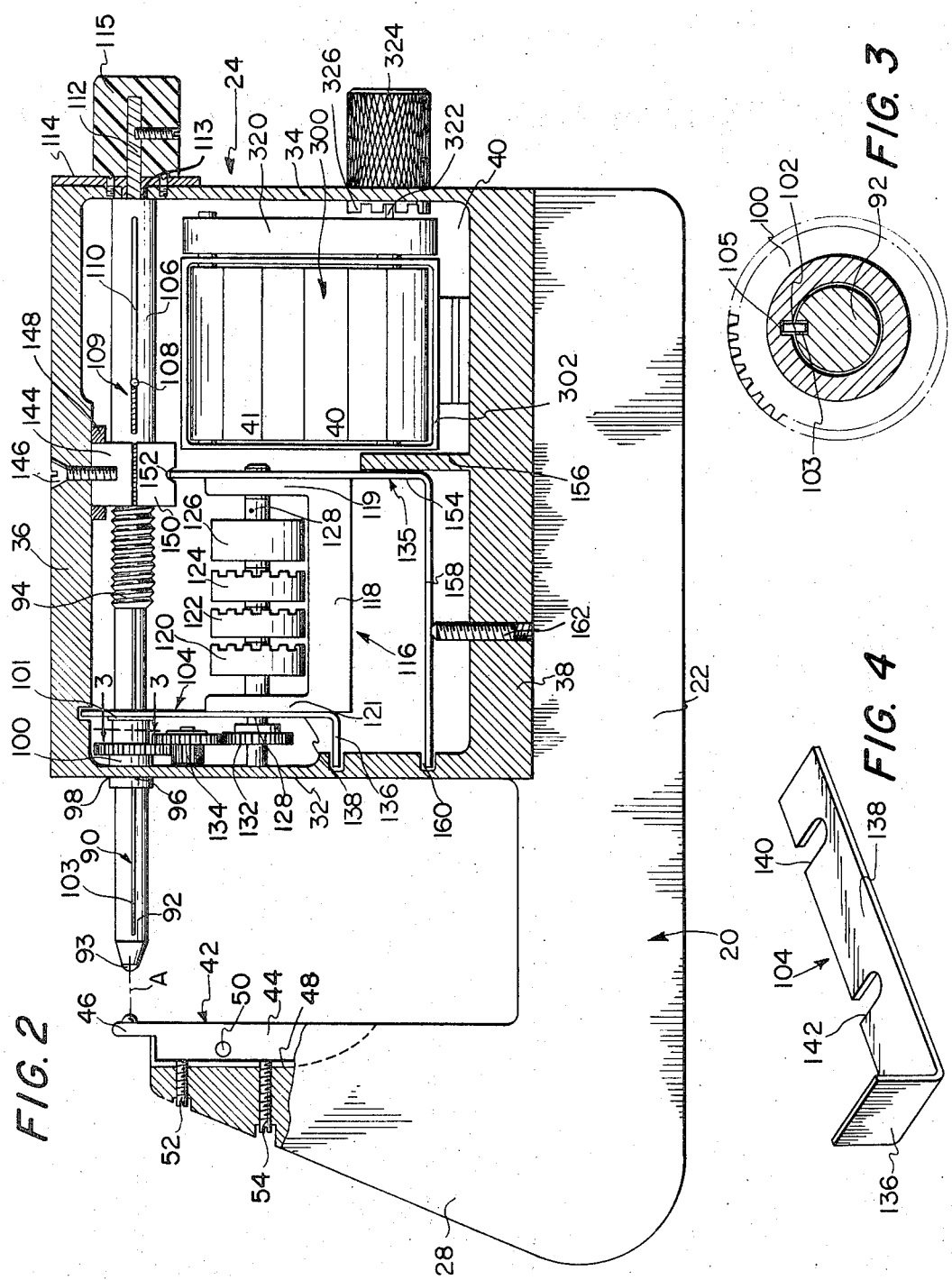

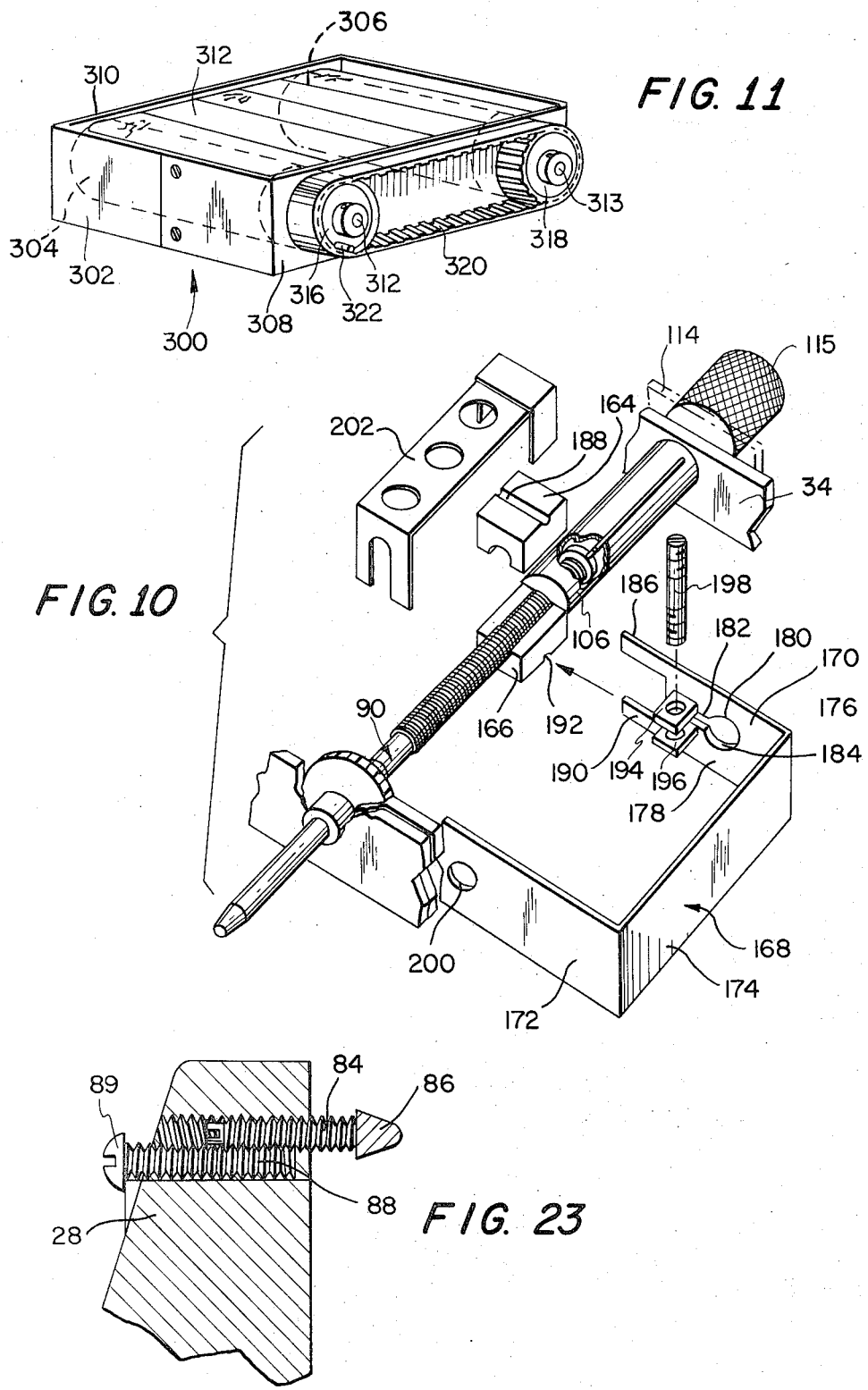

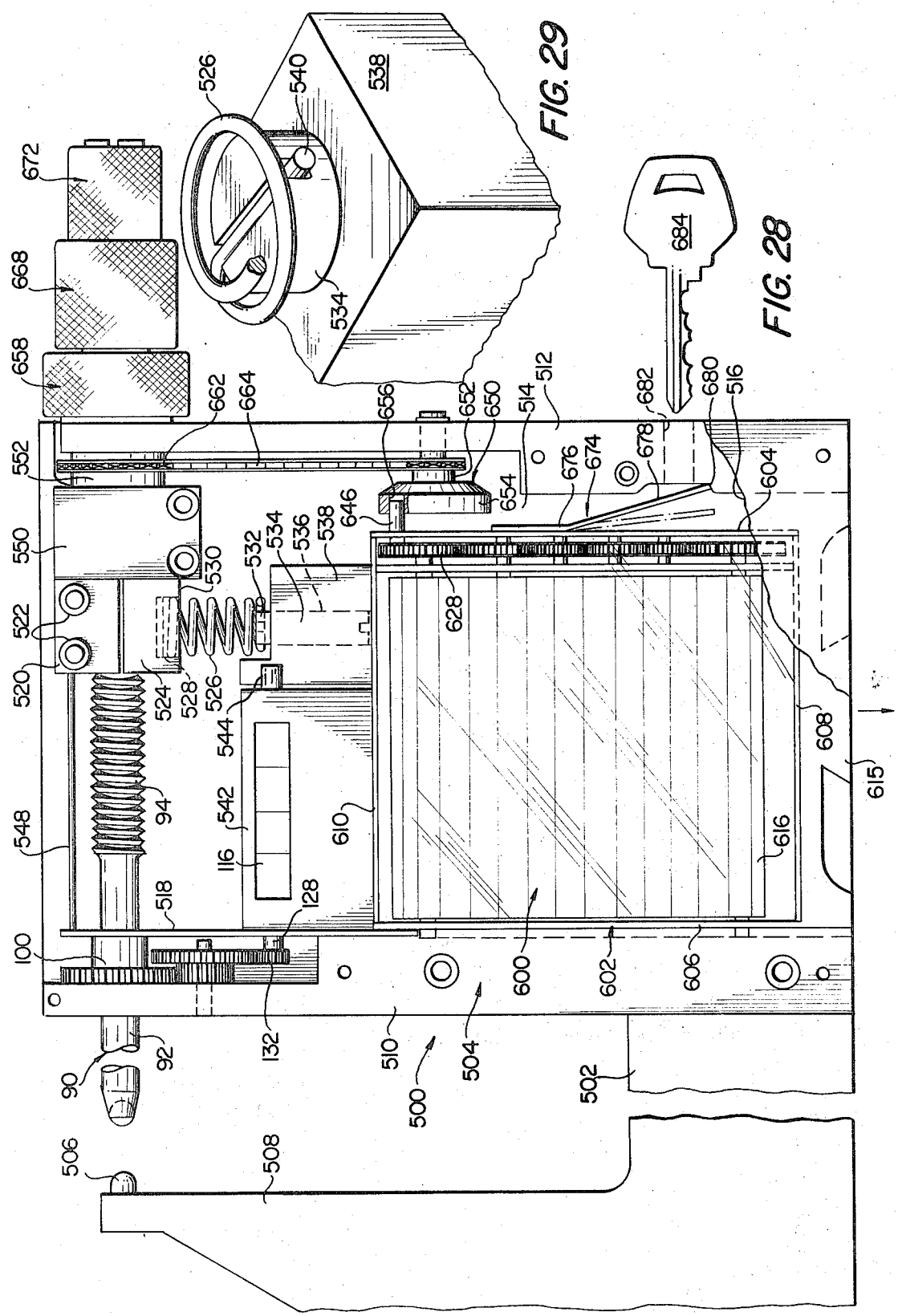

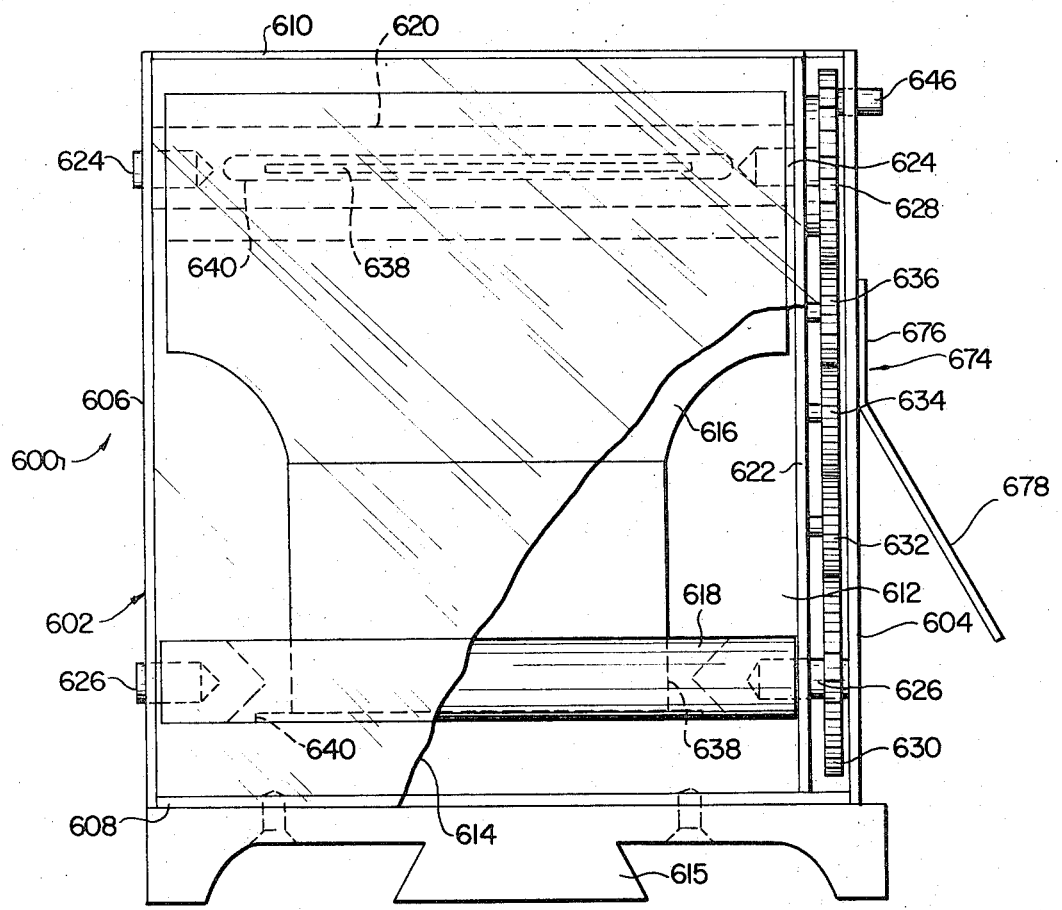
FIG. 32
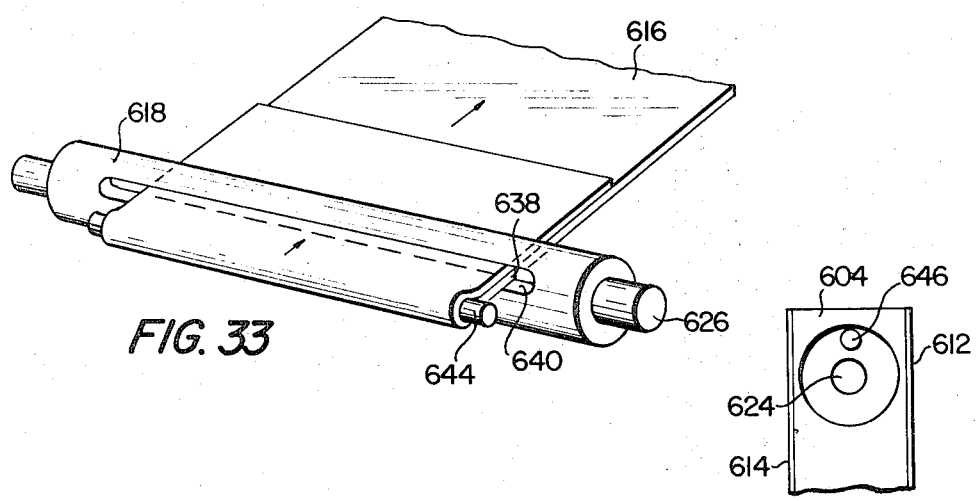
FIG. 33
FIG. 34

MICROMETER MEASURING DEVICES

This invention relates to improvements in micrometers, and more particularly relates to improvements for insuring accurate readings of micrometers throughout their life.

In the past, there have been many different types of micrometers based on the use of a threaded spindle or micrometer screw to obtain measurements of linear distances. These micrometers, for the most part, have been limited to one inch micrometers, that is, micrometers having a measuring range of at most one inch, as distinguished from the largest measurement that the micrometer can make.

A conventional micrometer includes a threaded spindle or micrometer screw which is longitudinally movable under the control of a nut. Attempts to provide micrometers with a greater than one inch range have met with difficulty because of the inaccuracies inherent in producing a thread of this length by ordinary methods. Further, the threads of the micrometer screw and nut are subject to wear during use of the micrometer. This wear results in play or a sloppy fit between the micrometer screw and the nut and causes inaccurate micrometer readings.

The prior art has recognized that error is introduced into the micrometer reading by the wear of the threads of the micrometer screw and nut, and has employed various means to compensate for this wear. Although the prior art has compensated for wear, this compensation has not always achieved a compensation of the error introduced by the wear, and in some cases where the sloppiness is continually compensated for, the error has been maximized. The prior art compensation for wear usually involves periodic adjustment of the nut on the micrometer screw after a certain amount of wear has occurred. Until this periodic adjustment is made, however, the sloppiness caused by the wear produces inaccurate micrometer readings.

Although the prior art has attempted to compensate for wear, the compensation efforts have not been entirely successful because in an ordinary micrometer the wear on the thread of the micrometer screw and nut is uneven so that some portions are worn more than other portions. Ordinarily, compensation is achieved by providing a slotted nut and means for periodically contracting the diameter of the nut so that the threads of the nut grip the threads of the micrometer screw more tightly. Where uneven wear occurs, the contracting of the diameter of the nut cannot entirely compensate for all of the play caused by the wear because if the nut is contracted until its threads engage the threads of the micrometer screw at a point where the most wear has occurred, then the nut will not allow the remaining portions of the micrometer screw threads that have not been subjected to as much wear to pass freely through the nut. On the other hand, if the nut is contracted to allow the portions of the micrometer screw thread that have not worn to pass freely through the nut during its travel, sloppiness will still be present at that portion of the micrometer screw thread that has been subjected to the most wear, and thus the error resulting from wear is never entirely corrected by the prior art slotted nuts.

The accurate measuring of the distance between two outside points of a workpiece is particularly important when the measuring is to be accomplished on the rotor of a disc brake because accuracy of that measurement determines whether the rotor can be safely used in the braking system of a moving vehicle, such as an automobile. An automobile disc braking system usually comprises a rotor attached to the wheel of the automobile and a plurality of brake pads which are normally positioned in an inactive position closely adjacent the opposed braking surfaces of the rotor. When it is desired to slow or stop a rotation of the wheel of an automobile, a brake operating mechanism is actuated to force the brake pads into frictional contact with the rotor. The frictional contact of the brake pads with the rotor results in a decrease in the rotation of the wheel.

The braking force exerted by the brake pads on the rotor is greatly dependent on the thickness of the rotor. In normal usage, the frictional contact between the rotor and the brake pads will cause the thickness of the rotor to decrease. As the thickness of the rotor decreases, the effective frictional engagement between it and the brake pads decreases, thereby resulting in a decrease in the ability of the braking system to stop the automobile. Eventually, the thickness of the rotor is decreased to a point where it is subject to failure due to the stresses caused by the frictional forces that are applied to it during the braking action. The minimum thickness that the rotor can have and still be safe for use is known as the "discard thickness," and thus it is important to be able to accurately measure the thickness of the rotor to determine whether it has reached the discard thickness. If the thickness of the rotor is less than the discard thickness it must be discarded and replaced with a new rotor.

The introduction of disc brakes for use as the braking mechanism of motor vehicles has resulted in the need for a device which can determine when the disc brakes have been worn to an unsafe point. The original size of the rotors for disc brakes vary from a fraction of an inch to about two inches in thickness and the discard thickness for each type of rotor also varies. Thus, any instrument that is designed for determining whether a disc brake is still safe must be capable of measuring disc brake rotors at varying thickness from as small as three eighths of an inch to as large as two inches.

Further, once a measurement of a disc brake rotor has been obtained, it then must be compared with the "discard thickness" for that rotor. Due to the large number of makes and models of cars, the introduction of new models that occurs every year, and the correspondingly different size disc brakes for each of these cars, the listing of the discard thickness for each disc brake in an available place where the mechanic testing the disc brake system can readily obtain the discard thickness for the particular car which he is testing and compare it to the actual thickness of the disc brake presents still further problems. It is virtually impossible to remember all of the various discard thicknesses for all of the disc brakes currently in use, and with the increasing use of disc brakes on motor vehicles, a convenient source of this information is necessary to enable the mechanic to accurately and quickly assess the safety of the disc brake being tested.

Accordingly, it is a primary object of the present invention to provide a new and improved micrometer that accurately compensates for any wear that may occur in the threads of the micrometer spindle and control nut and that adjusts for error that normally would becaused by the wear.

A further object of this invention is to provide an accurate micrometer that is subject to reduced wear on its thread and that has a range of zero to two inches.

It is another object of this invention to provide a micrometer that can be easily read by the user and which will have a source of information so that the micrometer reading can be compared to the information on the source.

A still further object of the present invention is to provide a micrometer that can provide accurate readings even though all of its threads are not of the same size.

Additional objects and advantages of the present invention will be set forth in part in the description which follows and in part will be obvious from the description or can be learned by practice of the invention. The objects and advantages are achieved by means of the instrumentalities and combinations particularly pointed out in the appended claims.

To achieve the foregoing objects and in accordance with its purpose, as embodied and broadly described, the present invention provides a micrometer measuring device comprising a frame having a first reference means; a spindle mounted in the frame for axial movement and having a threaded section; a control nut extending partially around a longitudinal portion of the threaded section of the spindle and having threads mating with those of the spindle; means for positioning the control nut at a set longitudinal distance from the first reference means; and resilient force applying means acting transverse to the axis of the spindle to continuously urge the mating threads of the spindle and control nut into tight engagement with each other to maintain the roots and crests of the spindle in continuous alignment with the roots and crests of the control nut and provide for accurate readings of the micrometer.

Preferably, the resilient force applying means comprises a second nut means opposing the control nut and having threads mating with those of the threaded section of the spindle, and a biasing means engaged with the second nut means for urging the second nut means against the spindle. It is also preferred that the biasing means is a coil spring that is engaged with the second nut means. In one embodiment of the invention the control nut and second nut means are identical half nuts.

In accordance with the invention, the micrometer preferably includes a direct reading counter mechanism connected to the spindle for indicating the micrometer measurement, and the threaded length of the spindle is at least two inches to provide a micrometer range of from 0 to 2 inches. Preferably, gears connect the counter mechanism to the spindle and a choker plate prevents the gears from binding and positions the counter mechanism in the micrometer frame.

In accordance with the invention, the micrometer preferably includes a magazine mounted within the frame and having a tape provided with indicating measurements thereon. The tape is preferably wound on two spaced apart spools and made of plastic film having elastic recovery to provide a spring like action on the spools. Preferably, a magazine control and a spindle control are mounted on a common shaft. It is also preferred that the magazine is connected to an annular drive plate having a plurality of radially extending slots by means of a pin which is parallel to the axis of the spools and engaged in one of the slots.

It is to be understood that both the foregoing general description and the following detailed description are exemplary and explanatory but are not restrictive of the invention.

The accompanying drawings illustrate examples of preferred embodiments of the invention and together with this description serve to explain the principles of the invention. The same reference numerals in the figures indicate like parts.

Of the drawings:

FIG. 2 is a longitudinal sectional view of the micrometer of FIG. 1, showing the internal mechanisms of the micrometer.

FIG. 3 is a vertical sectional view taken along lines 3—3 of FIG. 2 showing the keying of the spindle to a drive gear.

FIG. 4 is a perspective view of a choker plate for positioning a counter mechanism in the housing of the micrometer.

FIG. 10 is an exploded perspective view, partially in section, of the spindle and control nut assembly of the micrometer of FIG. 9.

FIG. 11 is a perspective view of a magazine constructed in accordance with the teachings of the present invention and insertable into the micrometer.

FIGS. 21, 22 and 23 are section views showing alternate embodiments of adjustable anvils constructed in accordance with the teachings of the present invention.

FIG. 28 is a partial sectional view of a preferred embodiment of the invention and shows the use of a coil spring to apply resilient pressure to a bottom half nut.

FIG. 29 is a partial perspective view of an adjusting means for adjusting the resilient pressure of the coil spring shown in FIG. 28.

FIG. 32 is an elevational view of a preferred magazine constructed in accordance with the teachings of the present invention.

FIG. 33 is a partial perspective view showing a preferred attachment of a tape to the spools of the magazine of FIG. 32.

FIG. 34 is a side view of the upper portion of the right side of the magazine of FIG. 32.

Figure 1:
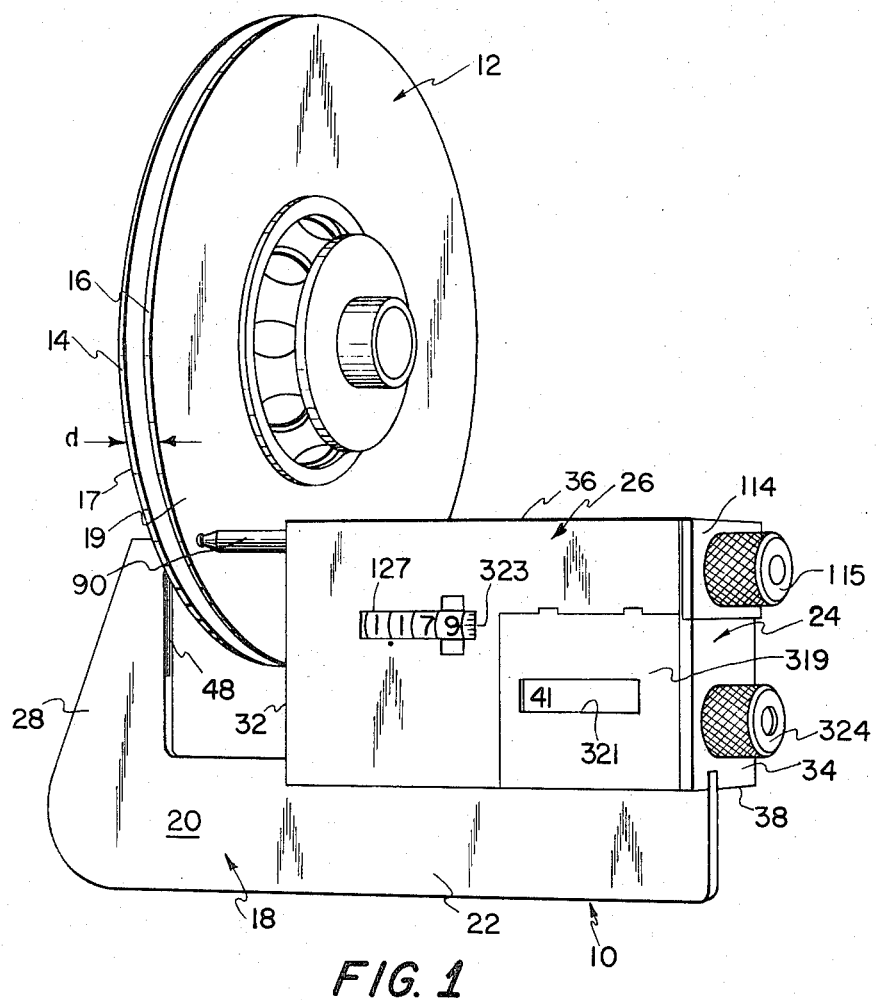
FIG. 1 is a perspective view of a micrometer constructed in accordance with the teachings of the present invention showing its use for measuring a disc brake rotor.

Referring to FIG. 1, the present invention is embodied in a micrometer, generally 10, for measuring the thickness of a rotor, generally 12, of a disc braking system. Rotor 12 comprises two spaced apart annular rotor plates 14 and 16. Rotor plate 14 has an outside frictional surface 17 and rotor plate 16 has an outside frictional surface 19. Frictional brake pads (not shown) are mounted closely adjacent each rotor plate 14 and 16 and are brought into contact with frictional surfaces 17 and 19 when a braking force is required. The thickness "d" between the outside frictional surfaces 17 and 19 of rotor plates 14 and 16 is used to determine the safety of the braking system by comparing it to the discard thickness for that rotor. In addition, the thickness of each rotor plate 14 and 16 is also important in determining the safety of the disc brake rotor, and the micrometer of the present invention is designed to individually measure the thickness of each of the plates 14 and 16.

In accordance with the present invention, the micrometer includes a frame having a first reference means. As here embodied, the frame, generally 18, comprises an L-shaped base plate 20 and a housing, generally 24, that is secured to the base plate. Base plate 20 has a vertically extending measuring arm 28 and a horizontally extending leg 22. Housing 24 is secured to leg 22 and is spaced from measuring arm 28. A vertically extending side wall 32 of housing 24 opposes arm 28 of base plate 20 to form the conventional U-shaped measuring end of the micrometer where the workpiece to be measured is placed. The distance between measuring arm 28 and side wall 32 is slightly greater than two inches to permit work pieces ranging in length from zero to two inches to be measured by the micrometer of the present invention.

Housing 24 is wider than base plate 20 and has a number of cavities for receiving the various mechanisms and parts of the present micrometer which are described in detail hereafter. Housing 24 is rectangular in cross-sectional shape, and as best seen in FIGS. 1 and 2, is defined by side wall 32, a second opposing side wall 34, a top wall 36, a bottom wall 38 and a back wall 40. The front of housing 24 is closed by a cover, generally 26, also described in greater detail hereafter.

As best seen in FIG. 2, the first reference means is an anvil, generally 42, that is secured to the top of measuring arm 28. Anvil 42 comprises an elongated shank 44 and a head 46 which serves as the reference point from which all measurements are taken. Anvil head 44 is made of a suitably hardened carbide material that resists wear and lies along the line of measurement "A" of the workpiece being measured. As best seen in FIGS. 1 and 2, shank 44 is pivotally mounted on a pivot pin 50 in a vertically extending elongated slot 48 of measuring arm 28 that extends perpendicular to the line of measurement "A".

In accordance with a preferred embodiment of the invention, means are provided for pivotally adjusting the anvil and locking it in adjusted position by creating opposing moment arm forces on each side of its pivot point. As here embodied, this means comprises a first adjusting screw 52 which is threaded into measuring 28 above pivot pin 50 and abuts against shank 44, and a second adjusting screw 54 which is threaded into measuring arm 28 below the pivot pin and also abuts against the shank. Adjusting screws 52 and 54 are individually adjustable to control the position of anvil 42 about pivot pin 50 and thus change the position of the reference point. Screws 52 and 54 are recessed into measuring arm 28 so that they cannot be inadvertently moved, and have slotted heads which are accessible from the outer side of measuring arm 28 for turning the screws. Each adjusting screw 52 and 54 is adjusted to abut against shank 44 and create an opposing moment arm force about pivot pin 50, so that the screws lock anvil 42 into adjusted position.

Figure 21:
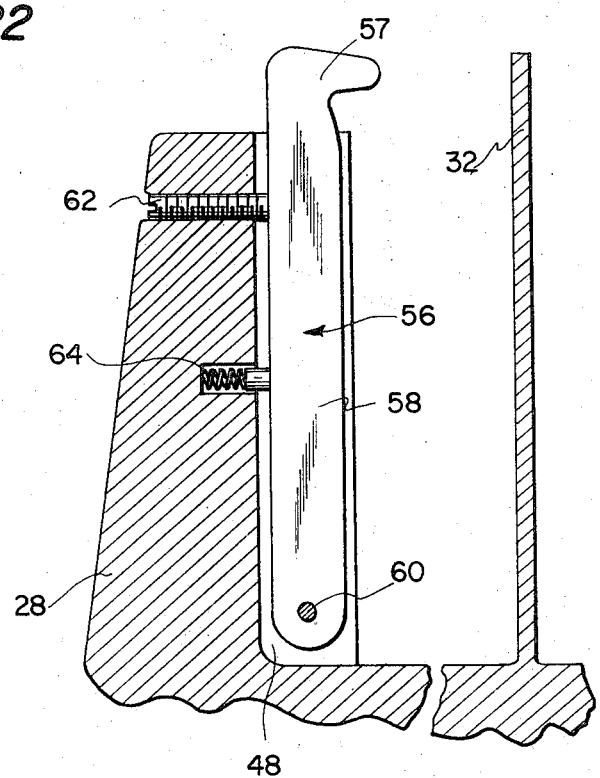

A further embodiment of a pivotable anvil and means for adjusting and locking its position is shown in FIG. 21 where an anvil, generally 56, comprises a shank 58 that is pivotally connected at its bottom to a measuring arm 28 by a pivot pin 60. An adjusting screw 62 extends through the top of measuring arm 28 and abuts against the top of anvil 56 below its anvil head 57 to apply pressure to force the anvil head toward side wall 32. A spring 64 is attached to shank 58 and measuring arm 28 intermediate adjusting screw 62 and pivot pin 60, and applies a force on the shank which opposes that of the adjusting screw to thereby lock the anvil in adjusted position and pull the anvil against the end of the screw.

Figure 22:
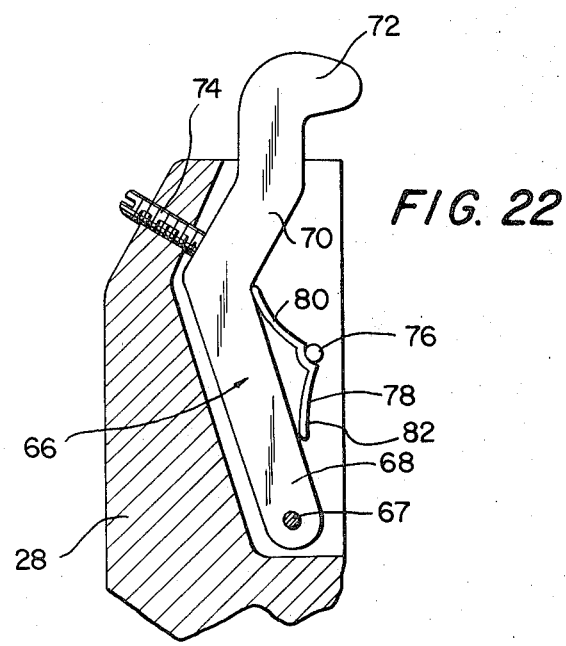

A still further embodiment of a pivotable anvil and means for adjusting and locking its position is shown in FIG. 22 where the anvil is in the form of an angle bar, generally 66, that is pivotally mounted at its bottom to measuring arm 28 by a pivot pin 67. Angle bar 66 has an inclined bottom leg 68 and an offset top arm 70. An anvil head 72 is attached to arm 70 and an adjusting screw 74 is mounted perpendicular to arm 70 and abuts against this arm to force angle bar 66 to move toward side wall 32. A stop 76 extends upwardly from measuring arm 28 on the side of angle bar 66 opposite the wide where screw 74 contacts the bar. A spring 78 having two legs 80 and 82 is positioned between stop 76 and angle bar 66 to oppose the force of adjusting screw 74 to thereby lock the anvil in adjusted position and force it against the end of the adjusting screw.

A further embodiment of an adjustable anvil that can be used in the present invention but which is not pivotable; is shown in FIG. 23, and comprises a top anvil screw 84 having an anvil head 86 and a locking screw 88 which is engaged with the anvil screw. Locking screw 88 has an exposed slotted head 89 which extends outwardly of measuring arm 28 to permit it to be turned, and locks anvil screw 84 in place when its slotted head 89 abuts against the side of measuring arm 28. Anvil screw 84 can be adjusted by releasing slotted head 89 of locking screw 88 from its engagement with the side of measuring arm 28 and then turning the anvil screw through its slotted head in a longitudinal direction either inwardly or outwardly to calibrate the micrometer. Anvil screw 84 is then locked in place by turning locking screw 88 to its locking position.

In accordance with the invention, a spindle having a threaded section is mounted in the frame for axial movement. As here embodied, and as best seen in FIG. 2, the spindle, generally 90, comprises a smooth cylindrical front measuring section 92 that passes through side wall 32 of housing 24 and a back threaded section 94. The front end of measuring section 92 has a carbide measuring tip 93. A bearing 96 is secured in an opening 98 at the top of side wall 32 and measuring section 92 passes through this bearing.

A drive gear 100 is mounted within housing 24 on measuring section 92 adjacent opening 98 by means of a key 102, best seen in FIG. 3, which rides in a longitudinally extending keyway 103 on the outer surface of measuring section 92 and an internal keyway 105 in gear 100. Key 102 is square and made of key stock. As viewed in FIG. 2, key 102 is inserted into keyway 105 of drive gear 100 and keyway 103 of measuring section 92 from the right. Bearing 96 prevents key 102 from further moving to the left into keyway 103 of measuring section 92 and out of keyway 105 of drive gear 100. A washer 101 is mounted around spindle 90 and abuts against drive gear 100. Washer 101 is forced against drive gear 100 by an L-shaped choker plate, generally 104, and described in greater detail hereafter, which is positioned around measuring section 92 adajcent drive gear 100. Washer 101 thus prevents key 102 from leaving keyway 105 of drive gear 100 to the right. Rotation of spindle 90 thus produced a corresponding rotation of drive gear 100.

Figure 5:
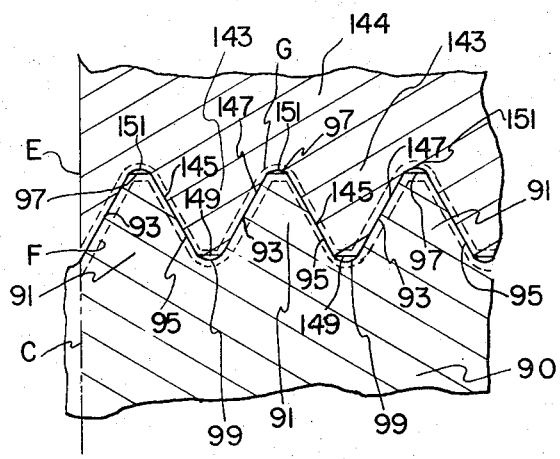
FIG. 5 is a cross-sectional view showing the threaded engagement of a portion of the spindle with a portion of the control nut of the micrometer of FIG. 1.

The length of threaded section 94 is slightly greater than two inches to permit spindle 90 to move through a two inch measuring range. Threaded section 94 has a pitch diameter of 0.4050 inches and is provided with 20 threads to the inch of the inclined plane type of thread form. As used herein, the term "thread form" refers to the profile or cross-section of the thread. Preferably, V-type thread forms are used and the right handed American National Unified thread if particularly preferred. This thread is illustrated in FIG. 5, which shows in full line three new threads 91 on spindle 90. Each thread 91 has a front face 93 and a back face 95. The front face 93 and back face 95 of a single thread are joined to each other by a crest 97, and the front face 93 is joined to the back face 95 of its adjacent thread by a root 99.

As seen in FIG. 2, a spindle drive shaft, generally 109, extends from threaded section 94 of spindle 90. Spindle drive shaft 109 includes an outer hollow sleeve 106 and threaded section 94 of spindle 90 is mounted in outer hollow sleeve 106 by means of a pin 108 that is fixed to the end of spindle 90 and which rides in a pair of diametrically opposed longitudinal slots 110 in the outer sleeve. Outer sleeve 106 has a solid drive shaft 112 that extends through a top opening 113 in side wall 34 of housing 24. A side cover plate 114 is mounted to side wall 34 outside of housing 24 by screws and has a bearing hub which extends through top opening 113 of side wall 34. Drive shaft 112 extends through this bearing hub to the outside of housing 24 and a control knob 115 is fixed by a set screw to drive shaft 112 outside of the housing for rotating outer sleeve 106. Rotation of outer sleeve 106 produces a corresponding rotation of spindle 90, and since spindle 90, as explained in greater detail hereafter, rotates under the control of a thread, its rotation causes it to move longitudinally toward or away from anvil 42 depending on its direction of rotation.

In accordance with a preferred embodiment of the invention, a direct reading counter mechanism is connected to the spindle. As here embodied, and as shown in FIG. 2, a conventional counter mechanism, generally 116, is mounted within housing 24 in a cavity adjacent side wall 32 of the housing. Counter mechanism 116 includes a U-shaped counter frame 118 having parallel ends 119 and 121 and four counting wheels 120, 122, 124 and 126 which are all mounted on a rotatable common drive shaft 128 extending through ends 119 and 121 of frame 118. Drive shaft 128 is operatively connected to counting wheel 126 which indicates the lowest unit of measurement of the micrometer. Rotation of drive shaft 128 thus produces a corresponding rotation of counting wheel 126. Counting wheels 120, 122 and 124, however, are normally prevented from rotating when drive shaft 128 is rotated, and instead are actuated by counting wheel 126. Cover plate 26 has a window 127 (FIG. 1) which is positioned over the counting wheels to permit the indicia on them to be easily viewed. A counter drive gear 132 is fixed to the end of drive shaft 128 adjacent end 121 of frame 118 so that rotation of drive gear 132 produces a rotation of drive shaft 128, and actuation of the counting wheels.

Counter drive gear 132 is connected to drive gear 100 mounted on measuring section 92 of spindle 90 by an intermediate transmission gear 134 which has a two gear cluster, one of which is engaged with drive gear 100 and one of which is engaged with counter drive gear 132. Counter mechanism 116 is maintained in position in housing 24 by L-shaped choker plate 104 and an L-shaped flat-leaf spring 135 described in greater detail hereafter. As best seen in FIGS. 2 and 4, choker plate 104 has a short leg 136 which s mounted in a recess in side wall 32 of housing 24 and a main leg 138 which is mounted in a recess of top wall 36 of the housing. Leg 138 has a first U-shaped cut-out 140 which abuts against measuring section 92 of spindle 90 and washer 101, and a second U-shaped cut-out 142 which abuts against drive shaft 128 of the counting mechanism to maintain counting mechanism 116 in proper relationship to housing 24. When spindle 90 is rotated so as to withdraw measuring section 92 from anvil 42 a back pressure is created on drive gear 100 which tends to force it against the side of gear 134, and thereby bind gears 100 and 134 against each other and prevent further withdrawal of the spindle. Choker plate 104, however, opposes this binding force and permits spindle 90 to be easily withdrawn without binding. Leaf spring 135 has a O-shaped cut-out which abuts against the other end of drive shaft 128 and cooperates in maintaining counter mechanism 116 in proper position.

In accordance with the invention, a control nut is provided which extends partially around a longitudinal portion of the threaded section of the spindle and has threads mating with those of the threaded section of the spindle. As here embodied, and as shown in FIG. 2, the control nut comprises a first half nut 144 which is fixed to top wall 36 of housing 24 by a screw 146. Top wall 36 has a boss 148 shaped to receive nut 144 and prevent longitudinal movement of the nut with respect to the spindle. Half nut 144 has V-type American National Unified Thread forms which mate with the thread forms of spindle 90. FIG. 5 shows two new threads 143 of half nut 144 in full line, each containing a front face 145 which mates with back face 95 of thread 91, a back face 147 which mates with front face 93 of thread 91, a crest 149 which joins front face 145 and back face 147 of a single thread to each other, and a root 151 which joins the front face 145 of one thread to the back face 147 of its adjacent threads. When the threads are new and the thread forms are identically sized and shaped, the roots 151 and crests 149 of threads 91 are in continuous alignment with the roots 99 and crests 97 of threads 143, that is, each root 99 of spindle 90 is in the same relative longitudinal position with respect to its corresponding crest 149 of control nut 144, and similarly each crest 97 of spindle 90 is in the same relative longitudinal position with respect to its corresponding root 151 of control nut 144.

In a preferred embodiment of the invention, the threaded length of the control nut is about twice the pitch diameter of threaded section 94 of spindle 90. The provision of a threaded length which is twice the pitch diameter of spindle 90 spreads and distributes the wear between the spindle and control nut over a greater length and reduces the wear on any one threaded portion. It has been found that a threaded length for the control nut of at least twice the pitch diameter of spindle 90 is the minimum length which will be effective in markedly reducing wear on the threads, and thus it is highly desirable to provide such a relationship in the micrometer of the present invention.

In accordance with the invention, means for positioning the control nut at a set longitudinal distance from the first reference means is provided. As here embodied, this means comprises boss 148 and screw 146 which secure first nut 144 to frame 18 and prevent longitudinal movement of the first nut with respect to the frame and anvil 42.

In accordance with the invention, resilient force applying means acts transverse to the axis of the spindle to continuously urge the mating threads of the spindle and control nut into tight engagement with each other to maintain the roots and crests of the threads of the spindle in continuous alignment with the roots and crests of the control nut and provide for accurate readings of the micrometer.

As here embodied, this force applying means acts perpendicularly to the axis of spindle 90 and comprises a second nut means in the form of a second half nut 150 which is aligned with and opposes first nut 144, and a biasing means in the form of a resilient L-shaped flat leaf spring 135 engaged with second nut 150. First nut 144 and second nut 150 are spaced from each other about the circumference of threaded section 94 and are continuously urged toward each other by leaf spring 135, but are sized so that they do not engage each other. The bottom surface of second nut 150 has a groove 152 at its center which perpendicularly intersects the longitudinal axis of spindle 90. Leaf spring 135 comprises a contact arm 154 and a base arm 158. Contact arm 154 of leaf spring 135 is seated in groove 152 and second nut 150 is free to pivot about the top edge of this arm. Second nut 150 is thus a freely floating nut and its longitudinal axis is free to rock radially with respect to the axis of spindle 90. The bottom of arm 154 abuts against a vertical extension 156 of bottom wall 38 of housing 24 and the outer end of the base arm 158 snaps into a recess 160 of side wall 32. An adjusting screw 162 is threaded into bottom wall 38 immediately below the approximate center of base arm 158 of leaf spring 135. Screw 162 engages base arm 158 and can be adjusted to vary the tension on leaf spring 135 to thereby vary the force applied to the spindle 90 by the leaf spring.

In a preferred embodiment of the invention, the length of the threads of second nut 150 is greater than twice the pitch diameter of spindle 90 to move evenly distribute the wear on the threads of second nut 150 and spindle 90 as discussed above.

Figure 6:
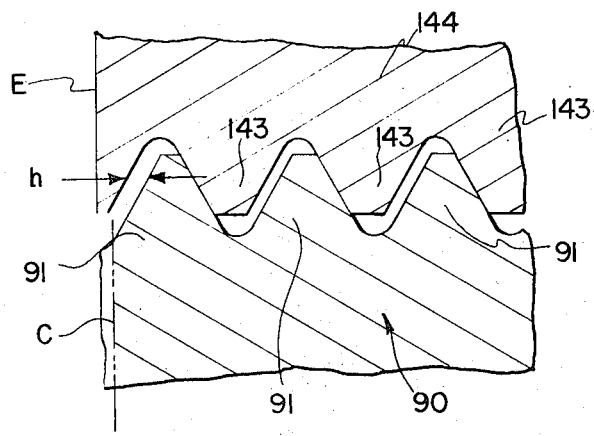
FIG. 6 is a cross-sectional view showing the same portions of the spindle and control nut as shown in FIG. 5 in threaded engagement as provided by prior art micrometers after their threads have worn.
Figure 7:
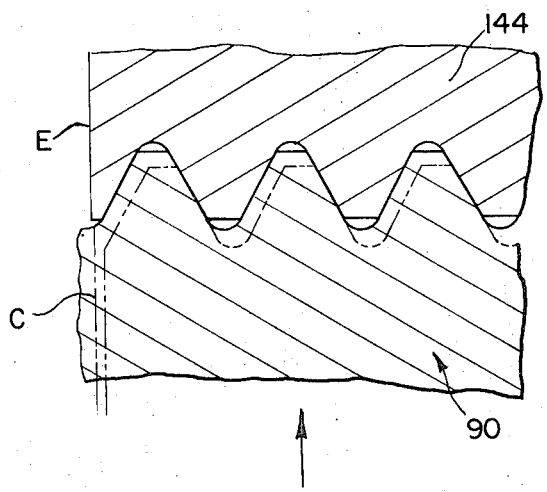
FIG. 7 is a cross-sectional view showing the same portions of the spindle and control nut shown in FIG. 5 in threaded engagement as provided by the present invention after their threads have worn.

The operation of the micrometer in compensating for wear and adjusting for error introduced by the wear is illustrated in FIGS. 5, 6 and 7. FIG. 5 shows in full line the relative position of the threads of control nut 144 and spindle 90 when these threads are new and are in continuous alignment. The relative position shown in full line in FIG. 5 corresponds to a particular linear distance between anvil 42 and spindle tip 93, a particular gaging pressure on a workpiece, and a particular number of rotations of spindle 90 from its zero position. This position must be reproduced by rotating spindle 90 with the same number of rotations from its zero position whenever the micrometer is to accurately indicate this linear distance because the counter mechanism translates the rotations of spindle 90 into linear distance. As long as the roots and crests are in alignment, the number of rotations for a particular distance will be the same. A reference line E on control nut 144, and a reference line C on spindle 90 are in alignment to indicate their relative position.

During use, the teeth 91 on spindle 90 and teeth 143 on control nut 144 are subject to wear so that the faces of the teeth become worn. The wear on the faces of teeth 91 of spindle 90 is shown by dotted line F in FIG. 5, and the wear on the faces of teeth 143 of control nut 144 is shown by dotted line G. The wear shown in FIGS. 5 to 7 is greatly exaggerated to illustrate the principles of the present invention. This wear ordinarily produces a longitudinal spacing "h" as shown in FIG. 6 between teeth 143 on control nut 144 and teeth 91 on spindle 90 and the spindle can thus move longitudinally within this spacing. When wear has occurred and tip 93 of spindle 90 engages a workpiece, a back pressure is created on spindle 90 allowing it to rotate additional turns before it will produce the same gaging force on the workpiece. This additional rotation is reflected in additional turns of the counter mechanism thereby producing an error in this reading. Using the original full size roots and crests of the threads of spindle 90 and control nut 144 as a reference, these original full size roots and crests are now not in alignment as indicated by reference lines E and C in FIG. 6.

Figure 8:
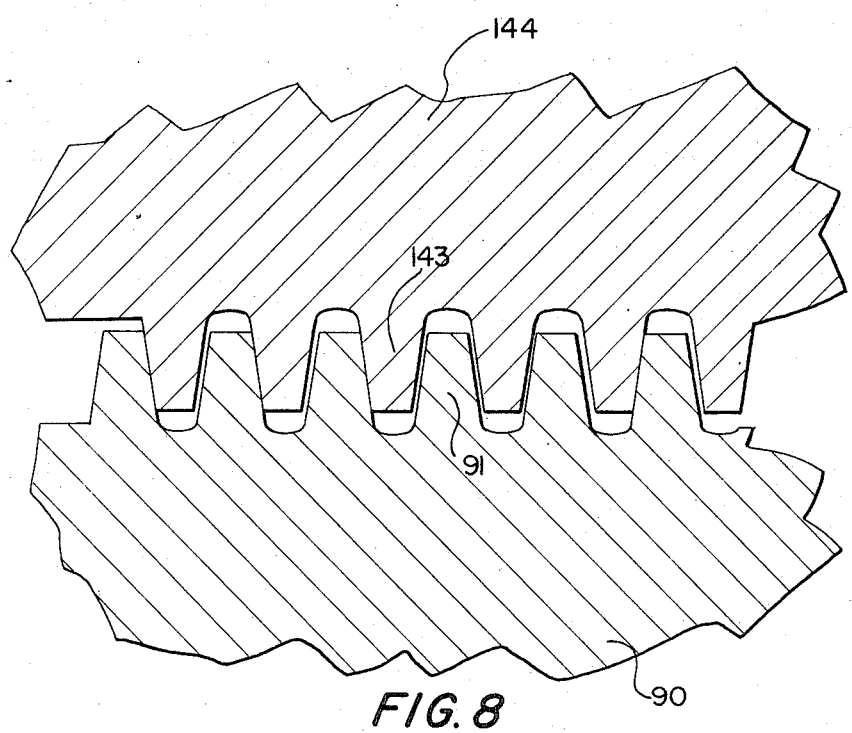
FIG. 8 is a cross-sectional view showing a larger portion of the threaded engagement of the spindle and control nut as provided by the present invention where the threads have been subject to uneven wear.

The present invention, however, because of the resilient pressure acting perpendicularly to the axis of spindle 90 and forcing control nut 144 and spindle 90 together, automatically moves spindle 90 relative to nut 144 so that its threads 91 move up on the inclined plane of the faces of threads 143 of control nut 144 as shown in FIG. 7 and causes spindle 90 to relatively move in a direction perpendicular to its axis. This relative movement on the inclined plane brings spindle 90 into tight engagement with threads 143 of control nut 144 so that the original full size roots and crests are maintained in continuous longitudinal alignment (see lines C and E) without additional rotation of the spindle, and thus error is not introduced into the micrometer reading by the wear. As illustrated in FIG. 8, because of uneven wear, all of the actual worn threads may not be in contact, but as long as the original full size roots and crests are in correct alignment, the worn threads will also be in correct continuous alignment and entire spindle 90 in correct position.

Second nut 150 thus pivots about contact arm 154 in response to any changes in the size of the thread form and pitch diameter of the threads of spindle 90 and control nut 144 to maintain these members in accurate measurement position even though their threads have become worn. The floating action of second unit 150 also aids in reducing wear on the threads of control nut 144 and spindle 90 because it permits the control nut 144 and spindle 90 to move relative to each other in response to an increase in the size of a particular thread, so that a large portion of the pressure caused by the larger thread will be resilient absorbed by leaf spring 135 and will not cause wear.

In accordance with a preferred embodiment of the invention, a magazine, generally 300, is provided in a recess of the cavity adjacent side wall 34 of housing 24. Magazine 300 includes a rectangular frame 302 (FIG. 11) and two spaced apart spools 304 and 306 which are journaled for rotation in opposing sides 308 and 310 of frame 302. A tape 312 is wound on spools 304 and 306 with the ends of the tape being secured to the spools by conventional means.

Spools 304 and 306 have drive shafts 312 and 313 respectively, which extend externally of frame 302 and rotatable members 316 and 318 are fixed externally of frame 302 to these drive shafts. An endless drive band 320 connects rotatable members 316 and 318.

Figure 12:
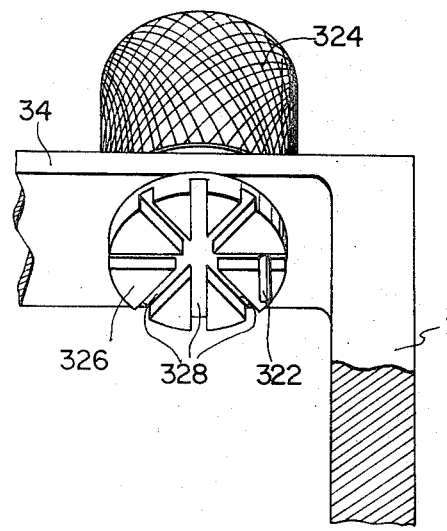
FIG. 12 is a partial perspective view of the portion of the micrometer housing adjacent the cavity for receiving the magazine and showing one embodiment of a means for driving the magazine.

In accordance with a preferred embodiment of the invention, a connecting means in the form of a straight pin 322 parallel to the axis of spool drive shaft 312 is attached to rotatable member 316 for easily inserting magazine 300 in housing 24 and connecting it to a magazine drive means. As best seen in FIGS. 2 and 12, a rotatable control knob 324 is mounted externally of housing 24 in alignment with rotatable member 316. Control know 324 has a shaft (not shown) which extends through wall 34 of housing 24 and an annular magazine drive plate 326 is fixed to this shaft internally of the housing. Drive plate 326 has at least one and preferably a plurality of radially extending slots 328 which begin at its outer edge and when magazine 300 is in operative position in housing 24, pin 318 is engaged in one of these slots. Rotation of control knob 324 causes drive plate 326 to rotate and becuase pin 322 is engaged in a slot 328 of the drive plate, rotatable member 316 will also rotate. This rotation of rotatable member 316 produces a corresponding rotation of rotatable member 318 thereby moving tape 312.

Front cover 26 has a hinged section 319 (FIG. 1) which overlies the cavity in housing 24 where magazine 300 is normally seated. To insert magazine 300 into housing 24, hinged section 319 is raised exposing the cavity in housing 24. Housing 24 and magazine 300 are held in a horizontal position. Magazine 300 is then lowered until pin 322 engages the outer edge of drive plate 326. If drive plate 326 is in a position where one of its slots 328 is aligned with pin 322, the pin will engage in the slot and magazine 300, due to gravity, will drop into housing 24 and set in position. If pin 322 does not immediately engage one of slots 328, control knob 324 is rotated to rotate drive plate 326 and bring one of its slots 328 into aligned position with the pin. As soon as a slot 328 is aligned with pin 322, the pin falls into the slot and sets magazine 300 in its correct position relative to housing 24. After magazine 300 is seated in housing 24, hinged section 319 is closed and is secured to frame 18 by screws.

Tape 312 is divided longitudinally into sections, with each section listing a car model, car year, and "discard thickness" for the disc brake rotor for that car. Each section of tape 312 is in alphabetical order so that the discard thickness for a particular car can easily be determined by rotating the tape until the desired section appears in a window 321 of hinged section 319 of front cover plate 26. The disc brake rotor size is then determined by miking the rotor, and this size is compared to the discard thickness indicated on the magazine. If the actual micrometer size is larger than the discard thickness, the rotor can still be used, but if it is smaller, the rotor is unsafe and should be discarded and replaced. Upon introduction of a new model year, magazine 300 can be removed, and replaced with a new magazine having a new tape with the revised information for the new model year.

The length of the tape 312 needed for storing all of the information necessary in readily viewable size to determine the thicknesses of rotors for all of the various years, makes and models of cars is approximately six feet and preferably 10 feet. This length of tape cannot be easily wound on spaced apart spools and be freely rotated from one end to another on these spools in a magazine without having the tape sag, bunch up, or jam. In one aspect of the present invention tape 312 is made of a plastic film having elastic recovery so that a spring-like action is provided on the magazine spools which together with the direct drive of both spools enable six to ten feet of tape to evenly move from one spool to another without any winding problems. Suitable tapes for this purpose can be made of any plastic film which is resilient and exhibits elastic recovery.

Thus, differentially stresses spring-like plastic films of, for example, polyethylene terephthalate, (sold under the trademark Mylar by the du Pont Company) polyamides (e.g. nylon), polyacrylonitrile, and copolymers of acrylonitrile with the other vinyl compounds, copolymers of vinyl chloride and vinylidene chloride, and polyhydrocarbons (e.g. polyethylene and polypropylene) can beused in making tapes 312. The resilient nature of tape 312 tends to force it against the inside surface of front cover plate 26 so that the plane of the tape is parallel to the plane of front cover plate 26 and tape 312 tends to ride against it.

It will be apparent to those skilled in the art that the micrometer of the present invention can be used to measure workpieces other than disc brake rotors without departing from the scope of this invention. Accordingly, the information on tape 312 can be tailored for use with other systems where it is important to have a readily available source of indicating measurements. The micrometer of the present invention is extremely accurate, and its counting wheel 126 is provided with ten equally spaced digits for reading in thousandths of an inch. The spacing between each digit is further divided by four equally spaced cross lines so that it can be read in ten thousandths of an inch with reference to an indicating marker 323 located on front cover plate 26. The present invention thus provides a micrometer of two inch capacity reading to ten thousandths of an inch on one line, in a single final group of numbers in which no verniers need be scrutinized. Of course, the micrometer can be made to read in dimensions other than inches, such as, for example, millimeters.

Figure 9:
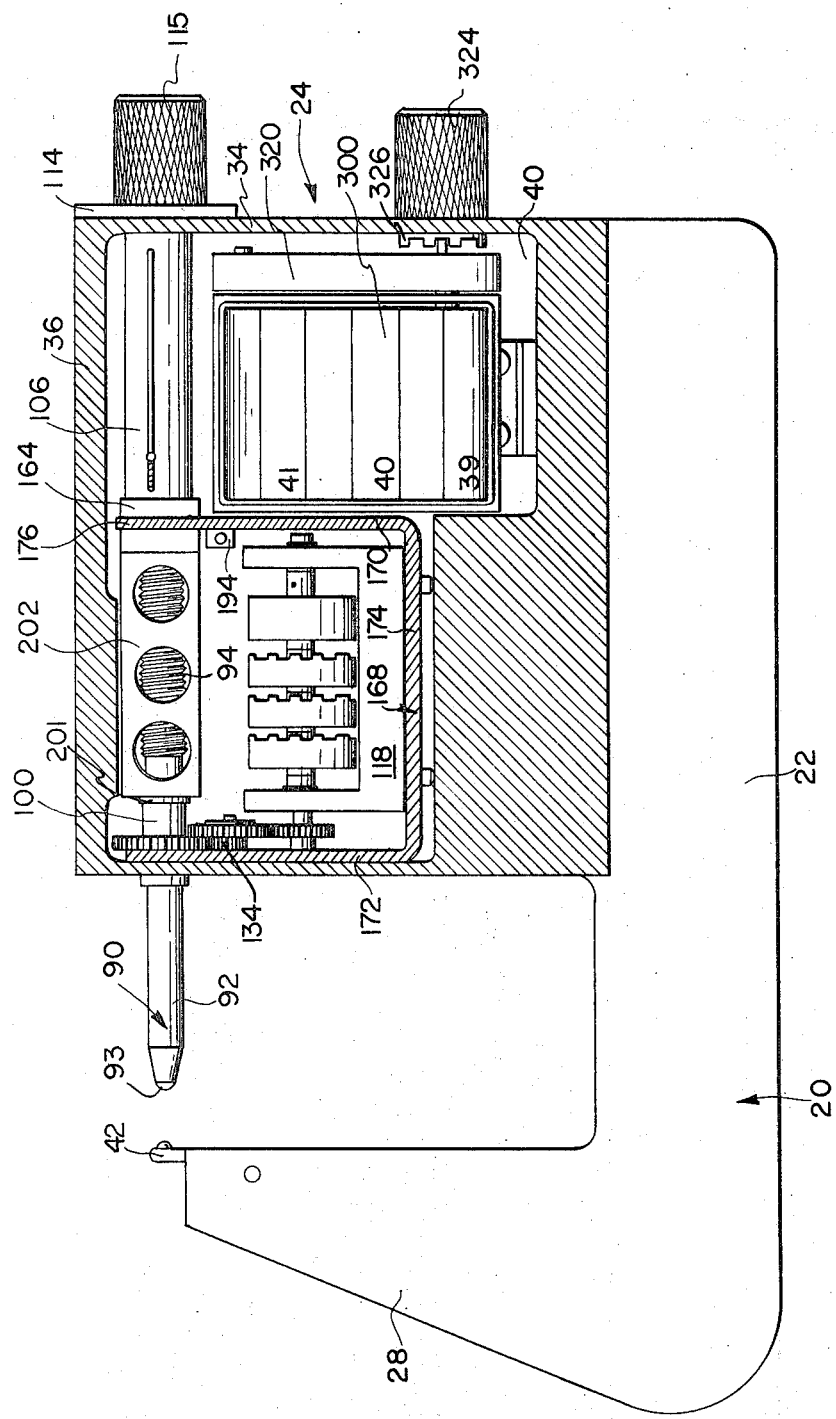
FIG. 9 is a longitudinal sectional view showing an alternate embodiment of the internal mechanisms of a micrometer constructed in accordance with the teachings of the present invention.

In an alternate embodiment of the invention, and as illustrated in FIGS. 9 and 10, the control nut and opposing second nut means each are contacted by biasing means and each functions in an identical manner. As here embodied, two half nuts 164 and 166 oppose each other around spindle 90 and meet in a plane that is parallel to back wall 40 of housing 24. Resilient force acting perpendicular to the longitudinal axis of spindle 90 is applied to each half nut 164 and 166 so that each half nut responds to changes in the pitch diameter of the threads by rocking relative to the axis of spindle 90. A U-shaped spring frame, generally 168, applies the pressure to half nuts 164 and 166 and as seen in FIGS. 9 and 10. comprise two parallel end plates 170 and 172, and a connecting plate 174. End plate 170 is split into two spring arms 176 and 178 by a spring slot 180. Spring slot 180 has a narrow elongated section 182 which terminates into a wider circular section 184 at one end and which is open at its opposite end. Spring arm 176 has an elongated extension 186 which seats in a groove 188 on the top surface of nut 164. Groove 188 extends perpendicular to the longitudinal axis of spindle 90. Spring arm 178 has a corresponding elongated extension 190 which seats a groove 192 on the bottom surface of nut 166. Nuts 164 and 166 are free to rock about extensions 186 and 190, with spring slot 180 applying a positive resilient force to the nuts.

A lug 194 having a threaded opening extends inwardly from spring arm 176 and a second lug 196 having an opening which is oppositely threaded extends inwardly from spring arm 178. An adjusting screw 198 has a smooth center section and is oppositely threaded on each end so that each end of the screw mates with one of the lugs 194 and 196. Adjusting screw 198 can thus be turned in either direction to increase or decrease the spring force provided on nuts 164 and 166 by spring frame 168. Frame 188 of counter mechanism 116 is secured to connecting plate 174 of spring frame 168 by two cap screws to form a counter subassembly. End plate 172 has an opening 200 at its top and a hub portion of drive gear 100 is mounted within the opening. Spindle 90 passes through drive gear 100 to position the counter subassembly in housing 24. A washer 201 abuts against the end of gear 100 and a choker plate 202 is positioned between washer 201 and end plate 170 of spring frame 168 to apply pressure to the washer to lock key 102 in drive gear 100 and to prevent drive gear 100 from moving backward and binding with intermediate transmission gear 134 when spindle 90 is withdrawn from the measuring end of the micrometer.

In this embodiment of the invention, nuts 164 and 166 are both radially movable so that each nut will act to compensate for variations in the size of the threads and reduce wear. Because nuts 164 and 166 are not fixed, they are free to move in a longitudinal direction during movement of spindle 90. To obtain accurate and reproducible measurements, at least one of these nuts must be at a set distance from anvil 42 when spindle 90 contacts the workpiece being measured. Outer sleeve 106 aids in positioning nuts 164 and 166 at a set distance from anvil 42 because when spindle 90 engages the workpiece, a back pressure is created which is transmitted to nuts 164 and 166. End plate 170 which holdes nuts 164 and 166 is resiliently attached to connecting plate 174 of spring frame 168, and when the back pressure is created, end plate 170 moves longitudinally until in contacts the end of outer sleeve 106 which is longitudinally fixed and thereby positions the nuts in the same longitudinal alignment whenever a measurement is made.

Figure 13:
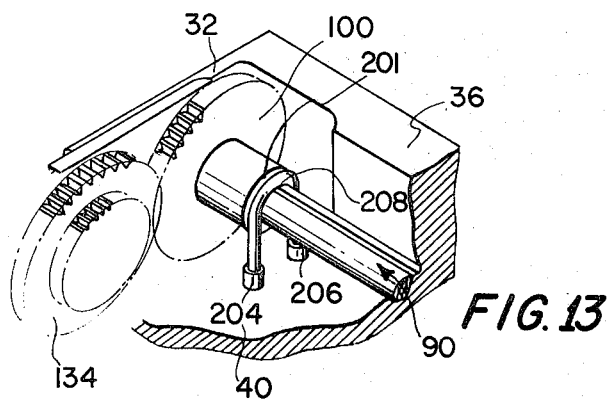
FIGS. 13, 14 and 15 are partial perspective views showing various alternate embodiments of chokers for maintaining the spindle and a drive gear for driving the counter mechanism in proper position.
Figure 14:
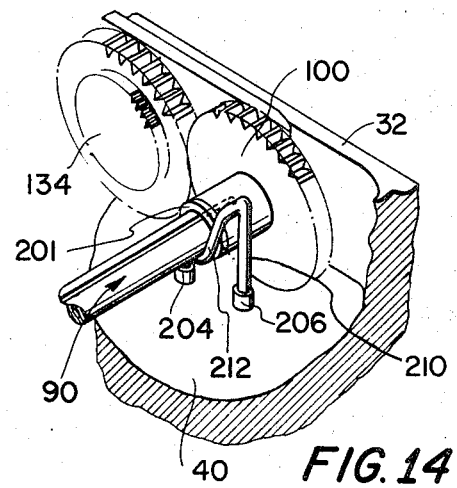

The present invention is not limited to the embodiments just described, and many other embodiments of the present invention exist. For example, FIG. 13 illustrates an alternative choker means for preventing gears 100 and 134 from binding and for locking key 102 in drive gear 100. This choker means comprises two bosses 204 and 206 on back wall 40 of housing 24 and a U-shaped bar 208 having its legs anchored in bosses 204 and 206 and its closed end abutting against washer 201 to force the washer against drive gear 100 and prevent it from moving backward and binding. A further embodiment of a choker means is illustrated in FIG. 14 and comprises a bar 210 having two legs anchored in bosses 204 and 206 and a curved connector 212 which joins the legs and is positioned between spindle 90 and back wall 40.

Figure 15:
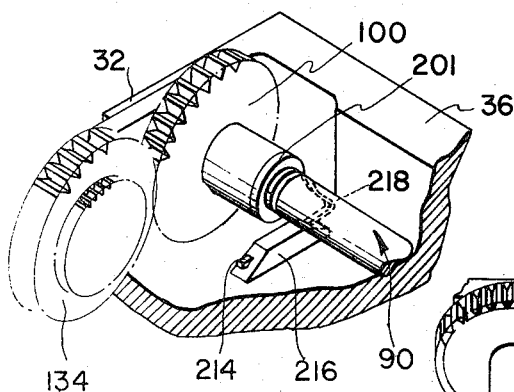

FIG. 15 illustrates a choker bar comprising a base 214 which is anchored in an elongated raised stop 216 on back wall 40, and a circular section 218 which abuts against washer 201.

Figure 16:
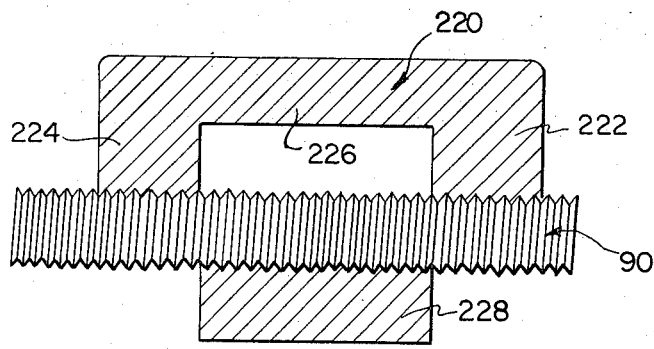
FIG. 16 is a sectional view showing an alternate embodiment of an assembly of a spindle, a control nut and an opposing nut.

Various other arrangemens of the control nut and opposing nut are also possible. For example, as shown in FIG. 16, one of these nuts, generally 220, can include two spaced apart threaded sections 222 and 224 joined by a base 226 and the other nut 228 is mounted on the other side of the spindle 90 directly opposite base 226. Only one of nuts 220 and 228 can be free to rock as in the embodiment illustrated in FIG. 2 or both of these nuts can be free to move as in the embodiment of FIGS. 9 and 10.

Figure 17:
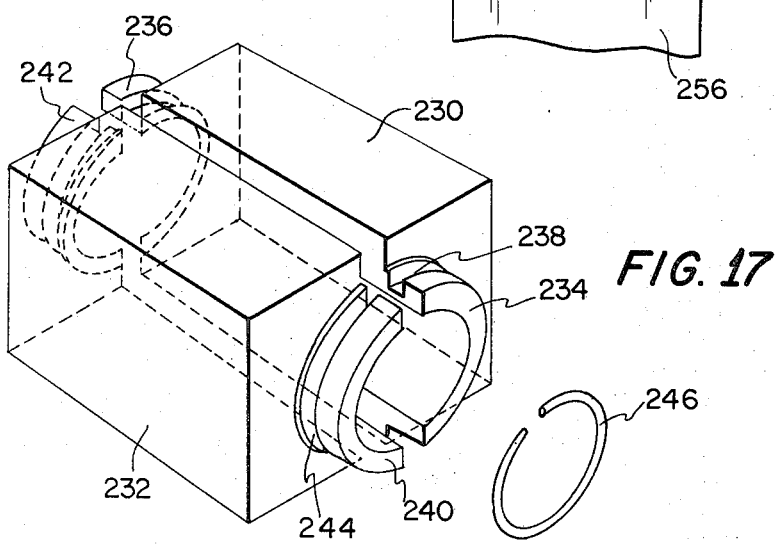
FIG. 17 is a perspective view of an alternate embodiment of a control nut and resilient force applying means constructed in accordance with the teachings of the present invention.

A still further arrangement is shown in FIG. 17 wherein two identical opposing split nuts 230 and 232 each are contacted by a biasing means. Split nut 230 has a semi-circular radial flange 234 on one of its ends and a similar flange 236 on its other end. Each flange 234 and 236 has a semi-circular groove 238. Nut 232 has a first flange 240 which opposes flange 234 and a second flange 242 which opposes flange 236. Each flange 240 and 242 has a semi-circular groove 244. A circular spring 246 snaps into grooves 238 and 244 of flanges 234 and 240, and a second circular spring (not shown) snaps into grooves 238 and 244 of flanges 236 and 242 to apply spring pressure to the nuts which acts perpendicular to the axis of spindle 90 to force them into tight engagement with the spindle.

Figure 18:
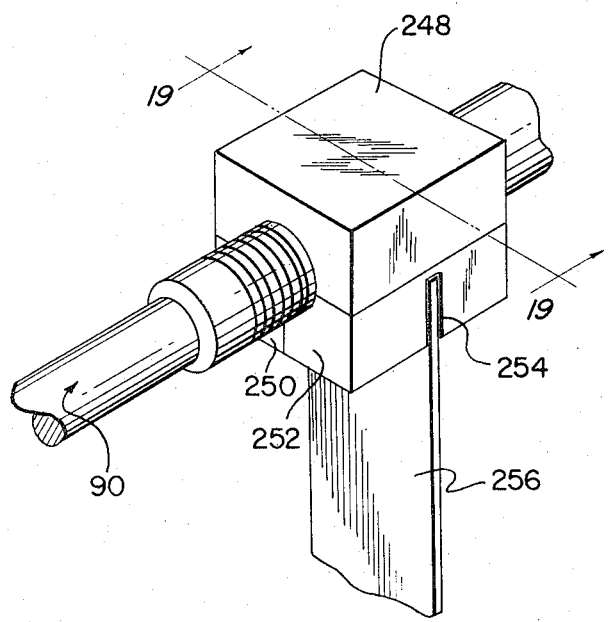
FIG. 18 is a perspective view of another alternate embodiment of a control nut and resilient force applying means constructed in accordance with the teachings of the present invention.
Figure 19:
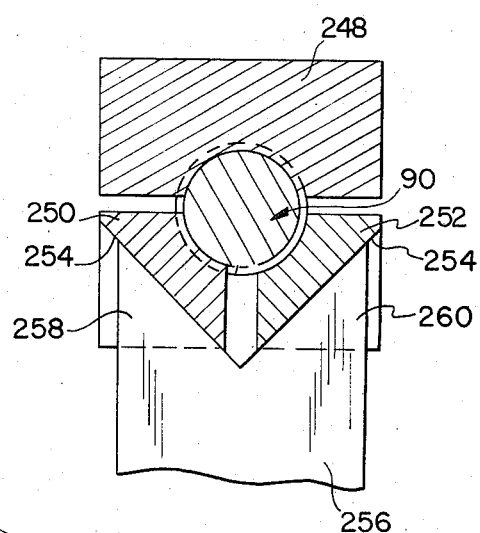
FIG. 19 is a vertical sectional view taken along lines 19—19 of FIG. 18.

A further embodiment is shown in FIGS. 18 and 19 where a first nut 248 is secured to frame 18 by a set screw (not shown). Opposing first nut 248 is two quarter nuts 250 and 252 mounted about spindle 90. Each nut 250 and 252 has a groove 254 that diagonally crosses the center of the nut and which is perpendicular to the axis of spindle 90. An L-shaped flat leaf spring 256 has a bifurcated end with two spring arms 258 and 260 that perpendicularly intersect each other. Spring arms 258 and 260 are shaped to the shape of diagonal grooves 254 of nuts 250 and 252, and seat in these grooves to apply the required resilient pressure to the nuts.

Figure 20:
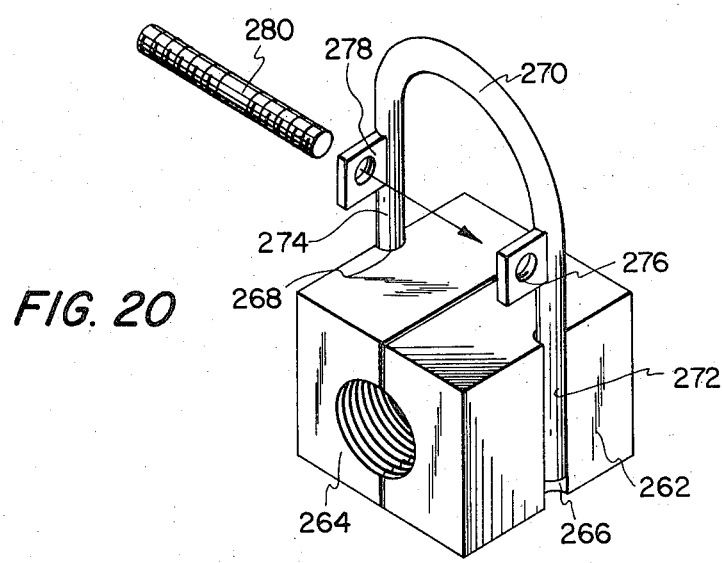
FIG. 20 is a perspective view of another alternate embodiment of a control nut and resilient force applying means.

A further embodiment of an arrrangement for resiliently applying pressure to the nuts is illustrated in FIG. 20 where two identical half nuts 262 and 264 have grooves 266 and 268, respectively, which are perpendicular to the longitudinal axis of spindle 90. A U-shaped spring 270 has a first leg 272 which is seated in groove 266 and a second leg 274 seated in groove 268 and applies the required resilient pressure on nuts 262 and 264. Leg 272 has a lug 276 which is internally threaded in one direction and leg 274 has an aligned opposing lug 278 which is internally threaded opposite to the threads of lugs 276. An adjusting screw 280 has a smooth center section and is oppositely threaded on each end so that each end of the screw mates with one of the lugs 276 and 278. Adjusting screw 280 can then be turned in either direction to increase or decrease the spring force provided by spring 270 on nuts 262 and 264.

Figure 25:
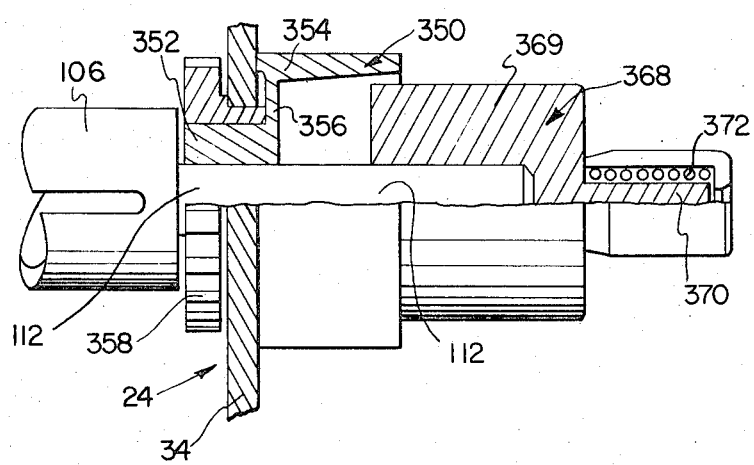
FIG. 25 is a sectional view of an embodiment of the invention where the controls for driving the magazine and for driving the spindle are mounted about a common shaft.

In a preferred embodiment of the invention, the controls for operating both the magazine and the spindle are mounted on a common shaft. As here embodied, and as shown in FIG. 25, the end of outer sleeve 106 adjacent wall 34 is spaced from the wall so that its drive shaft 112 partially extends into housing 24. A magazine drive knob, generally 350, is mounted about the portion of drive shaft 112 that is within housing 24. Magazine drive knob 350 comprises a hub 352 that has a rotating slip fit on drive shaft 112 and extends through a top opening of side wall 34, and an external drive ring 354 that is connected to hub 352 by a shoulder 356. A drive gear 358 is mounted about hut 352 of magazine drive knob 350 and is secured to the hub so that it will rotate when the magazine drive knob is rotated.

Figure 24:
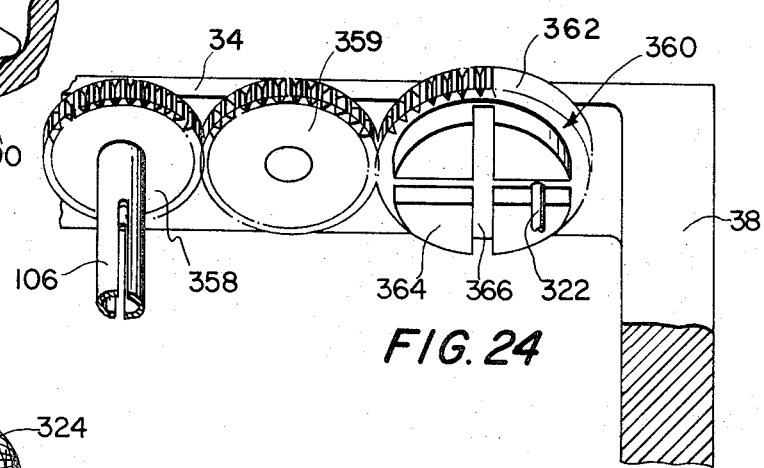
FIG. 24 is a partial perspective view of a portion of the micrometer housing adjacent the cavity for receiving the magazine and showing an alternate embodiment of a means for driving the magazine.

As best seen in FIG. 24, drive gear 358 is connected by an intermediate gear 359 journaled in side wall 34 to a magazine drive plate, generally 360, that opposes a rotatable member 316 of magazine 300. Drive plate 360 has an outer gear 362 engaged with intermediate gear 359 and a coupling plate 364 which opposes rotatable member 316 of magazine 300. Coupling plate 364 is provided with a plurality of radially extending slots 366 for engaging with pin 322 of rotatable member 316 so that magazine 300 can be inserted into housing 24 and connected to magazine drive plate 360 in the same manner as described above in reference to FIG. 12. Rotation of magazine drive knob 350 drives gears 358 and 359 and magazine drive plate 360 and thereby drives magazine 300, but since magazine drive knob 350 slips on drive shaft 112, rotation of the drive gear does not cause spindle 90 to be driven.

As seen in FIG. 25, a spindle drive knob, generally 368, having a main drive ring 369 is mounted outwardly of magazine drive knob 350 and is fixed to drive shaft 112 by a suitable means, such as a set screw (not shown). Spindle drive knob 368 has a reduced end section 370 and a conventional spring ratchet control 372 is mounted on this end section. Rotation of spindle drive knob 368 through drive ring 369 results in rotation of drive shaft 112 thereby driving spindle 90, but because magazine drive knob 350 has a slip fit on drive shaft 112, rotation of the drive shaft does not result in rotation and driving of magazine 300. Further, if desired, spindle drive knob 368 can be rotated by means of ratchet control 372 to insure that the same gaging pressure is used when taking measurements. Thus, spindle 90 and magazine 300 can be operated independently of each other by separate controls that are located immediately adjacent each other on drive shaft 112.

In accordance with another embodiment of the invention for operating the magazine and spindle, a control means is movable between a first position where a magazine operating means is operable and a spindle operating means is inoperable, and a second position where the magazine operating means is inoperable and the spindle operating means is operable.

Figure 27:
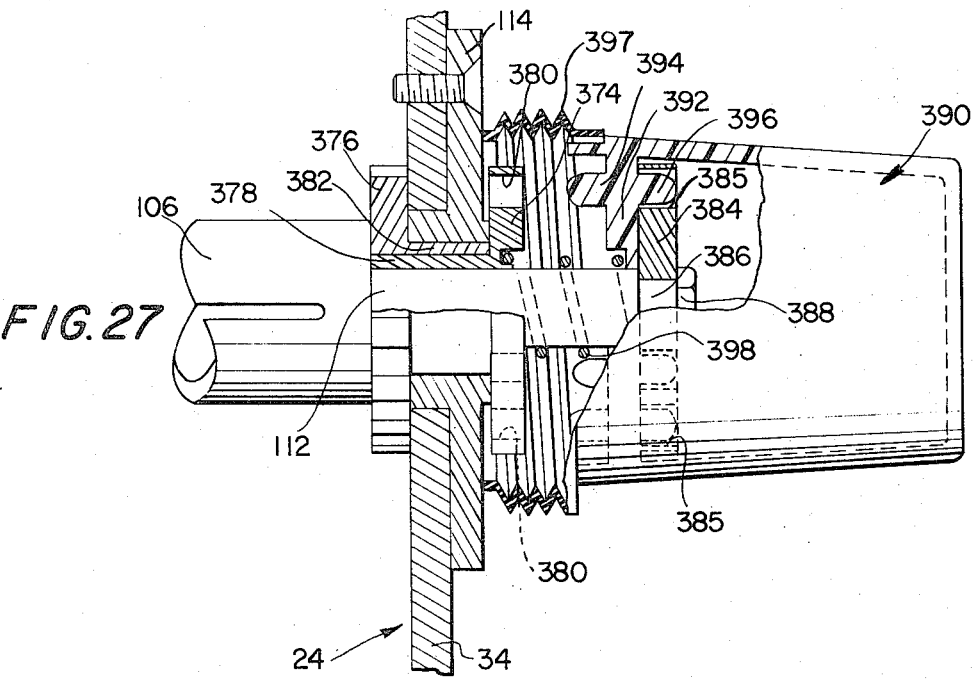

As here embodied, and as seen in FIG. 27, the magazine operating means comprises a magazine coupler plate 374 extending externally of housing 24, a magazine drive gear 376 having its gear teeth extending internally of housing 24, and a magazine drive plate (not shown) which is identical to drive plate 360 shown in FIG. 24, and is connected to drive gear 376 by a suitable intermediate transmission gear similar to gear 359 of FIG. 24. The end of outer sleeve 106 adjacent wall 34 is spaced from the wall so that drive shaft 112 partially extends into housing 24. Magazine coupler plate 374 has a hub 378 that has a rotating slip fit around the portion of drive shaft 112 that extends into housing 24. Magazine coupler plate 374 is provided with means for engaging a control, and as here embodied, this means comprises six equidistant arcuately spaced openings 380 that extend through the thickness of the plate. Magazine drive gear 376 has a hub 382 that is secured to hub 378 of magazine coupler plate 374 by a press fit so that rotation of the magazine coupler plate produces a rotation of magazine drive gear 376, without rotation of drive shaft 112.

As here embodied, the spindle operating means comprises an annular shaft coupler plate 384 which is spaced outwardly of magazine coupler plate 374 and fixed to a reduced end section 386 of drive shaft 112 by a nut 388. Shaft coupler plate 384 is provided with means for engaging a control and as here embodied this means comprises six equidistant arcuately spaced openings 385 that extend through the thickness of the plate.

As here embodied, the control means comprises a two-position control knob, generally 390, having an annular drive plate 392 mounted about shaft 112 between magazine coupler plate 374 and shaft coupler plate 384. Control drive plate 392 is provided with means for drivingly engaging magazine coupler plate 374 and shaft coupler plate 384. As here embodied, this means comprises a first series of six studs 394 which axially extend from the side of drive plate 392 that opposes magazine coupler plate 374 and a second series of six axially extending studs 396 on the other side of driver plate 392. Studs 394 can be axially aligned with openings 380 of magazine coupler plate 374, and can fit within these openings to couple control driver plate 392 to magazine coupler plate 374. Similarly, studs 396 can be axially aligned with openings 385 of shaft coupler plate 384, and can fit within these openings to couple control drive plate 392 to shaft coupler plate 384. A spring 398 is mounted about shaft 112 between magazine coupler plate 374 and control drive plate 392 to normally urge drive plate 392 into driving engagement with shaft coupler plate 384.

When control driver plate 392 is engaged with the shaft coupler plate 384, studs 394 are out of engagement with magazine coupler plate 374. Thus, rotation of control knob 390 when it is coupled to shaft coupler plate 384 produces a rotation of the shaft coupler plate and drive shaft 112 to thereby rotate spindle 90. Further, it is impossible to rotate magazine coupler plate 374 to operate magazine 300 when control driver plate 392 is engaged with shaft coupler plate 384 because it is then out of engagement with the magazine coupler plate. When it is desired to operate magazine 300, control knob 390 is pushed forward to overcome the bias of spring 398 and bring studs 394 of control driver plate 392 into engagement with openings 380 of magazine coupler plate 374. If necessary, control knob 390 can be rotated to bring studs 394 into alignment with openings 380. The distance that control knob 390 must travel to engage openings 380 is sufficiently great so that studs 396 become disengaged from shaft drive plate 384.

Rotation of control knob 390 when it is coupled to magazine coupler plate 374 produces a rotation of magazine drive gear 376 and thus causes the spools of magazine 300 to rotate. Further, it is impossible to rotate shaft coupler plate 384 when control driver plate 392 is engaged with magazine coupler plate 374 because the control driver plate is then out of engagement with the shaft driver plate. If desired, a ratchet control can be attached to control knob 390. An annular rubber cover 397 is positioned between side cover plate 114 and control knob 390 to prevent dust from entering the mechanism.

Figure 26:
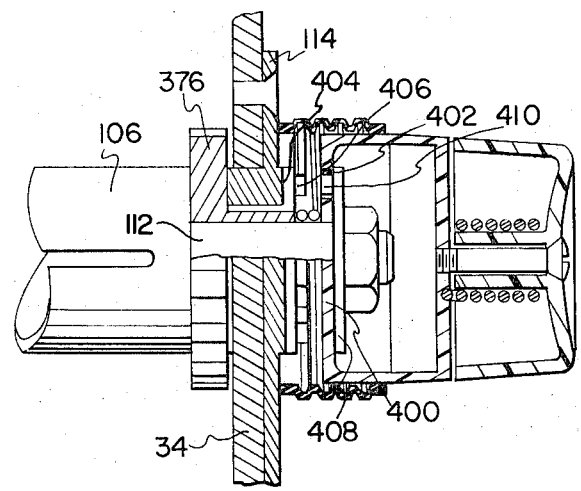
FIGS. 26 and 27 are sectional views of alternate embodiments of the invention where the controls for driving the magazine and for driving the spindle are mounted about a common shaft.

In a further embodiment of a two position control means, and as illustrated in FIG. 26, a control drive plate 400 is provided with a series of six equidistant arcuately spaced openings 402. A magazine coupler plate 404 mounted on one side of control drive plate 400 is provided with a series of six arcuately spaced studs 406 which can be aligned with openings 402 and received therein. Similarly, a shaft coupler plate 408 mounted on the other side of control drive plate 400 is provided with a series of six equidistant arcuately spaced studs 410 which can be aligned with openings 402 and received therein. The operation of this embodiment is identical to the operation of the previous embodiment, except that control plate 400 now receives either studs 406 or studs 410 to effect coupling.

A preferred embodiment of the invention is illustrated in FIGS. 28-34. In this embodiment of the invention, the micrometer includes a frame, generally 500, comprised of an L-shaped base plate 502 and a housing, generally 504. A first reference means in the form of an anvil-calibrating screw 506 having a carbide ball tip is threadably mounted at the top of a measuring arm 508 of base plate 502. Anvil calibrating screw 506 is recessed into the top of measuring arm 508 and is provided with a close tolerance fit so that it cannot be inadvertently moved.

Housing 504 includes a first side wall 510, an opposing second side wall 512 and a back wall 514. A cover 516 closes the front and top of the housing, and the bottom of the housing is open.

A spindle 90 having a front measuring section 92 and a back threaded section 94 passes through side wall 510 of housing 504. A spindle drive gear 100 is mounted within housing 504 on measuring section 92 by means of key 102, as in FIG. 3. A choker and calibrating plate 518, described in greater detail hereafter, is pivotally mounted about spindle 90 adjacent spindle drive gear 100 to prevent pin 102 from leaving the keyway of drive gear 100 to the right.

A control nut in the form of a first half nut 520 extends partially around a top longitudinal portion of threaded section 94 of spindle 90. Half nut 520 is secured to back wall 514 of the micrometer by two cap screws 522 that prevent longitudinal movement of half nut 520 with respect to the frame and anvil screw 506.

Figure 30:
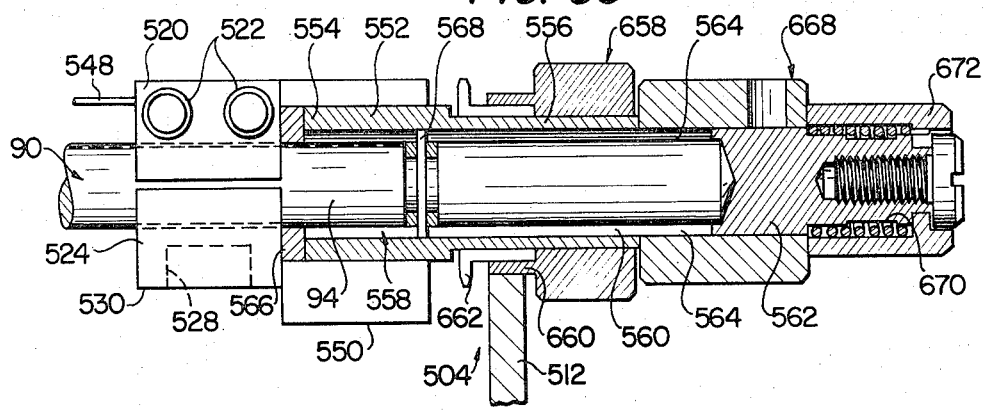
FIG. 30 is a sectional view and shows an assembly of the controls for driving the magazine and for driving the spindle of FIG. 28.

In this embodiment of the invention, a resilient force applying means acting perpendicular to the axis of spindle 90 comprises a second half nut 524 which is aligned with and opposes first half nut 520 and a coil spring 526. As best seen in FIGS. 28 and 30, half nut 524 has a centrally located circular recess 528 on its bottom surface 530. Coil spring 526 has its top end seated in recess 528 and its bottom end seated in a slotted end 532 of a screw 534. Screw 534 is threadably mounted in a threaded hole 536 that extends through a stop 538 that rises from back wall 514 of housing 504 below half nut 524. As best seen in FIGS. 28 and 29, a straight cross-leg 540 extends from and diametrically intersects the bottom coil of coil spring 526, and this cross-leg is seated in screw 534. Screw 534 is identically slotted at both of its ends to permit either end of the screw to be inserted into stop 538 when the micrometer is assembled. The resilient pressure of coil spring 526 on bottom half nut 524 can be adjusted when necessary by raising or lowering the amount that screw 534 extends above the top of stop 538. Screw 534 can be reached from the bottom of housing 504 by removing from the housing a magazine, generally 600, described in greater detail hereafter. Because cross leg 540 is diametrically positioned on coil spring 526 and recess 528 is at the center of half nut 524, the resilient pressure of the coil spring is evenly distributed to bottom half nut 524 to enable it to respond evenly to changes in the thread of spindle 90.

Figure 31:
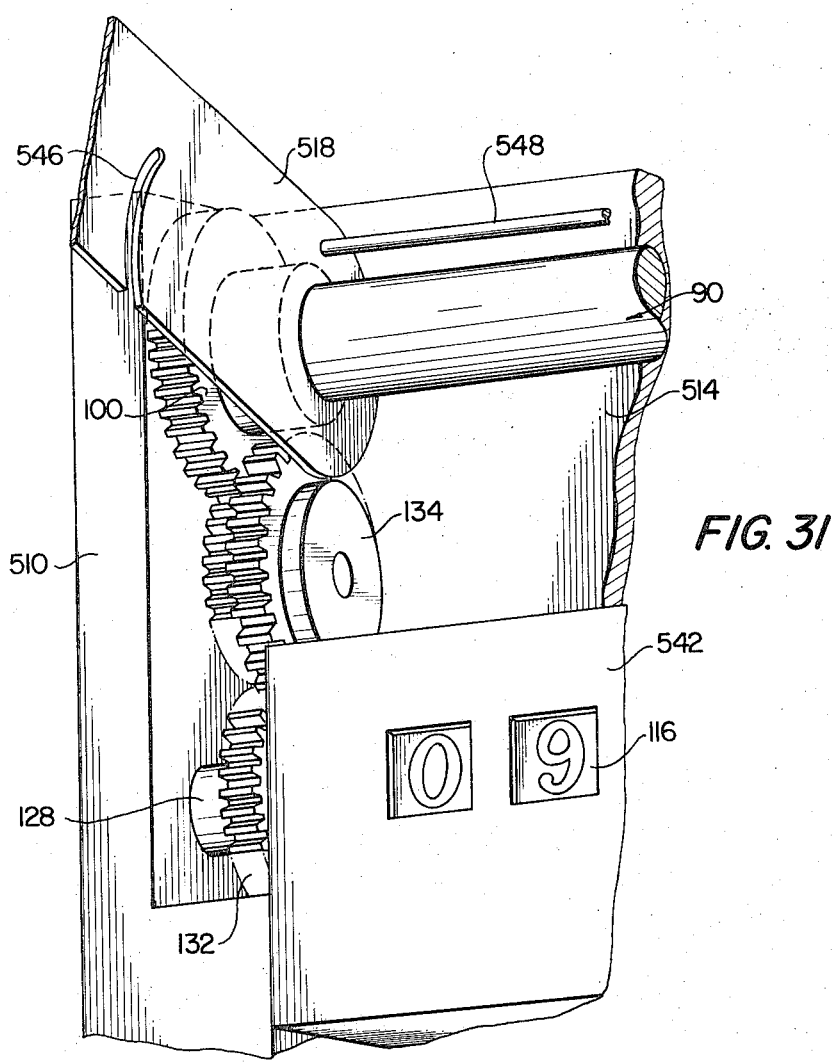
FIG. 31 is a partial perspective view showing the gear arrangement between the spindle of FIG. 28 and a counter mechanism.

A direct reading counter mechanism 116 is connected to spindle 90 and is mounted in a cavity of housing 504 between stop 538 and side wall 510 of the housing. A counter mask 542 covers counter mechanism 116, but has openings to permit the indicia on the counting wheels to be viewed through the front cover 516 of the micrometer. As best seen in FIGS. 28 and 31, a counter drive gear 132 on drive shaft 128 of counter mechanism is connected to spindle drive gear 100 by an intermediate transmission gear 134. Drive shaft 128 of counter mechanism 116 has one of its ends mounted in a recess 544 of stop 538 and its other end held by choker plate 518 so that the countermechanism is maintained in proper relationship to housing 504. Recess 544 extends from the front of stop 538 toward back wall 514 of housing 504. Choker plate 518 positions counter mechanism 116 in housing 504 by means of an arcuate slot 546 (FIG. 31) which engages one end of drive shaft 128 when the choker plate is in operating position. Choker plate 518 can be easily disengaged from drive shaft 128 by pivoting it around spindle 90 as shown in FIG. 31. Counter mechanism 116 can then be easily lifted out of recess 544 of stop 538 and disengaged with intermediate gear 134 to permit the counter mechanism to be calibrated.

Choker plate 518 also functions to keep gears 100 and 134 from binding when spindle 90 is withdrawn from the measuring end of the micrometer. A straight keeper wire 548 is positioned between top half nut 520 and choker plate 518 to apply pressure to the choker plate to enable it to overcome the binding back pressure of the gears.

As best seen in FIGS. 28 and 30, a spindle support block 550 extends upwardly from back wall 514 adjacent half nuts 520 and 524 to support threaded section 94 of spindle 90. A spindle support bushing 552 is mounted within and secured to support block 550. Bushing 552 has a first end 554 within support block 550 spaced from the end of the block adjacent half nuts 520 and 524, and has a reduced end section 556 that extends from within housing 504 to outside of the housing past side wall 512. A rotatable spindle drive shaft, generally 558 is mounted between support bushing 552 and spindle 90. Spindle drive shaft 558 includes an outer hollow sleeve 560 and a solid drive shaft 562. Outer hollow sleeve 560 extends from within bushing 522 out of housing 504 past side wall 512 and reduced end section 556 of bushing 552, and has two diametrically opposed longtiudinal slots 564. A pin 568 at the end of threaded section 94 of spindle 90 rides in these slots so that a rotation of outer sleeve 560 produces a corresponding rotation of the spindle. The end of outer sleeve 560 that is within bushing 552 has a flange 566 that extends past the bushing, and this flange is positioned between the sides of half nuts 520 and 524 and the end of bushing 552 to maintain spindle drive shaft 558 in proper position relative to housing 504.

In this embodiment of the invention, and as best seen in FIG. 28, a magazine 600 is mounted below counter mechanism 116 between side walls 510 and 512 of housing. As seen in FIGS. 28 and 32, magazine 600 includes a frame, generally 602, having two opposed outside walls 604 and 606, a bottom wall 60i, a top wal 610, a back wall 612, and a front wall 614. A floor plate 615 is secured to bottom wall 608 of magazine 600. Floor plate 615 provides a hand grip for grasping magazine 600 so that it can be inserted into or removed from the open bottom of micrometer housing 504.

Front wall 614 is made of transparent plastic to enable an information tape 616 to be viewed from the front of the magazine. Tape 616 is wound on two spaced apart spools 618 and 210 that are journaled for rotation in magazine 600. An inner side wall 622 is spaced from outside wall 604 of magazine 600 and spools 618 and 620 are journaled in this inner side wall and outside wall 606 through drive pins 624 on spool 620 and drive pins 626 on spool 618.

Spools 618 and 620 are connected to each other by a positive drive means so that rotation of one of the spools produces an equal and corresponding rotation of the other. As here embodied, a rotatable member in the form of a drive gear 628 is secured to drive pin 624 between inner wall 622 and outside wall 604 of magazine 600. Similarly, a second rotatable member in the form of a drive gear 630 is secured to drive pin 626 between inner wall 622 and outside wall 604. A series of three intermediate gears 632, 634 and 636 connect drive gears 628 and 630 so that rotation of drive gear 628 produces a rotation of drive gear 630 and of spools 618 and 620. The provision of a positive drive for both spools 618 and 620 aids in obtaining an even drive to tape 616. As will be apparent to those skilled in the art other means can be used to provide a positive drive, such as, for example, a bead chain, sprocket chain or ladder chain and appropriate rotatable members for these chains.

The ends of tape 616 are preferably secured to spools 618 and 620 in the manner shown in FIGS. 32 and 33. As seen in FIGS. 32 and 33, each spool 618 and 620 is provided with a slot 638 running through a diameter of the spool. Slot 638 opens into a keeper wire receiving recess 640 at one of its ends. To attach tape 616 to, for example, spool 618, one end of the tape is folded to twice its thickness and this end is then inserted into slot 638 at the end of the spool opposite that of recess 640 until it extends past the recess as shown in FIG. 33. The two thicknesses are slightly separated and a tape keeper wire 644 is inserted between them. The thickened tape end is then pulled back toward spool 618 until keeper wire 644 is firmly positioned in recess 640. Spool 618 is then turned to wind substantially all of tape 616 on the spool. When the other end of the tape is reached, it is inserted in spool 620 in the same manner as just described. The ends of the tape are now firmly positioned on spools 616 and 618 and they can be rotated in either direction without disattachment.

In winding the tape on spool 618, it is important to wind substantilly all of the tape on one spool before winding any of the tape on the spool 620 in order to obtain the benefit of the elastic recovery provided by the preferred tapes of this invention. The resilient nature of tape 616 tends to force it against front wall 614 of magazine 600 so that the plane of the tape is parallel to the plane of front wall 614. Tape 616 thus tends to ride against front wall 614. The resilient nature of tape 616 also permits the rotating force of drive gear 628 to be transmitted to the tape without any lost motion so that the tape immediately responds to rotation of drive gear 628 in an even manner.

In accordance with this preferred embodiment of the invention a connecting means in the form of a straight pin 646 is attached off center to drive gear 628 for inserting magazine 600 in housing 504 and connecting it to a magazine drive means. As best seen in FIG. 28 a magazine drive plate, generally 650, opposes drive gear 628 of magazine 600. Drive plate 650 is journaled in side wall 512 of micrometer housing 504 and comprises an outer drive sprocket 652 and a coupling plate 654 which opposes drive gear 628 of magazine 600. Coupling plate 654 is provided with a radially extending slot 656 for engaging with pin 646 of drive gear 628 so that magazine 600 can be inserted into housing 504 and connected to magazine drive plate 650. If magazine drive plate 650 is not in a position where its slot 656 is aligned with pin 646, it can be rotated, as explained in greater detail hereafter, to bring its slot into aligned position with pin 646. As best seen in FIG. 34 outside wall 604 has a circular opening at its top to permit pin 646 to rotate with drive gear 628 and be connected to magazine drive plate 650.

In this preferred embodiment of the invention, the controls for operating both the magazine and the spindle are mounted on a common shaft. As here embodied, and as shown in FIGS. 28 and 30 a magazine drive knob, generally 658, is mounted about the reduced end section 556 of bushing 552 outside of housing 504. Magazine drive knob 658 has a rotating slip fit on bushing 552 and has a hub 660 that is spaced from bushing 552 and extends into housing 502. A drive sprocket 662 is secured to hub 660 and is sliably mounted for rotation about the reduced end section 556 of bushing 552 within housing 502. Drive sprocket 662 thus will rotate when magazine drive knob 658 is rotated.

As best seen in FIG. 28, drive sprocket 662 is connected by a sprocket chain 664 to drive sprocket 652 of magazine drive plate 650. Rotation of magazine drive knob 658 drives sprocket 652 and thus causes magazine drive plate 650 to rotate. In turn, drive gear 628 of magazine 600 is rotated and tape 616 is turned. Since magazine drive knob 685 is isolated from outer sleeve 560 by bushing 552 and slips on the bushing, rotation of magazine drive knob 658 does not cause spindle 90 to be driven.

As seen in FIG. 28, a spindle drive knob, generally 668, is mounted outwardly of magazine drive knob 658 and is fixed to drive shaft 562 by a suitable means, such as set screw (not shown). Drive shaft 562 has a reduced end section 670 and a conventional spring ratchet control 672 is mounted on this end section. Rotation of spindle drive knob 668 results in rotation of drive shaft 562 and outer sleeve 560 thereby driving spindle 90, but because magazine drive knob 658 is isolated from outer sleeve 560, this rotation does not result in rotation and driving of magazine 600. Further, if desired, spindle drive shaft 558 can be rotated by means of ratchet control 372 to insure that the same gaging pressure is used when taking measurements. Thus, spindle 90 and magazine 600 can be operated independently of each other by separate controls that are located immediately adjacent each other on spindle drive shaft 558.

In accordance with the invention, locking means are provided on the magazine to lock it into position in housing 504 of micrometer frame 500. As here embodied, and as shown in FIG. 28, this means comprises a flat leaf spring 674 that is secured to outside wall 604 of magazine 600. Leaf spring 674 comprises an anchor leg 676 attached to outside wall 604, and a downwardly extending locking leg 678 that is angled away from outside wall 608 and toward side wall 512 of housing 504. Side wall 504 has an inner lip 680 and when magazine 600 is inserted far enough into housing 504, locking leg 678 of leaf spring 674 engages this lip and prevents the magazine from being removed from the housing. Top wall 610 of magazine 600 abuts against stop 538 when locking leg 678 engages lip 680 to prevent movement of the magazine within housing. A keyway 682 is provided in side wall 512 adjacent the locked position of leaf spring 674. When it is desired to remove magazine 600 from housing 500, a key 684, such as a house key or car key, is inserted into keyway 682 to depress locking leg 674 clear from lip 680 as shown in phantom line in FIG. 28. While locking leg 674 is depressed, magazine 600 can be grasped by floor plate 615 and removed from housing 504. When inserting magazine 600 into housing 504 locking leg 674 cannot lock into lip 680 until connecting pin 646 engages in magazine drive plate 650.

The invention in its broader aspects is not limited to the specific details shown and described and departures may be made from such details without departing from the principles of the invention and without sacrificing its chief advantages.

What is claimed is:
1. A micrometer measuring device comprising:
   a. a frame having a first reference means;
   b. a spindle mounted in said frame for axial movement and having a threaded section;
   c. a control nut extending partially around a longitudinal portion of the threaded section of said spindle and having threads mating with those of the spindle;
   d. means for positioning the control nut at a set longitudinal distance from the first reference means, and
   e. resilient force applying means acting transverse to the axis of said spindle for continuously urging the mating threads of the spindle and nut into tight engagement with each other to maintain the roots and crests of the threads of the spindle in continuous alignment with the roots and crests of the control nut and provided for accurate readings of the micrometer, the resilient force applying means comprising a floating second nut means spaced from, non-engaging with, and opposing said control nut and having threads mating with those of the threaded section of the spindle, and a biasing means engaged with said second nut means for urging said second nut means against said spindle.

2. The device of claim 1 wherein said biasing means is a spring.

3. The device of claim 1 including adjusting means to vary the tension of said biasing means.

4. The device of claim 1 wherein the threaded length of said control nut is about at least twice the pitch diameter of the threads of said spindle.

5. The device of claim 4 wherein the threaded length of said second nut means is the same as the threaded length of said control nut.

6. The device of claim 1 wherein said control nut is fixed to said frame.

7. The device of claim 1 wherein said control nut and said second nut means are identical half nuts.

8. The device of claim 1 wherein the threaded length of said spindle is at least two inches to provide a micrometer range of zero to two inches.

9. The device of claim 1 including a direct reading counter mechanism connected to the spindle for indicating the micrometer measurement.

10. The device of claim 9 wherein gears connect the counter mechanism to the spindle and a choker plate prevents the gears from binding.

11. The device of claim 10 wherein the choker plate engages the counter mechanism to position it in the micrometer frame.

12. The device of claim 11 wherein the choker plate engages one end of the counter mechanism and said biasing means engages an opposite end of the counter mechanism to aid in positioning it in the micrometer frame.

13. The device of claim 12 wherein said biasing means is an L-shaped flat leaf spring.

14. The device of claim 13 wherein said leaf spring comprises a contact arm engaged with said second nut means and a base arm perpendicular to said contact arm.

15. The device of claim 14 including an adjusting screw engaged with said base arm to vary the tension of the leaf spring.

16. The device of claim 9 wherein said biasing means is a flat leaf spring and said second nut means is pivotally engaged with said spring.

17. The device of claim 1 wherein one of said control nuts and second nut means has two spaced apart threaded sections.

18. The device of claim 17 wherein the threads of the other of said control nut and second nut means are between said spaced apart threaded sections.

19. The device of claim 1 wherein said control nut and said opposing second nut means are each contacted by biasing means acting transverse to the spindle axis.

20. The device of claim 19 wherein said biasing means connects said control nut and opposing nut.

21. The device of claim 19 wherein said biasing means comprises a generally U-shaped spring frame having a bifurcated first end plate to provide two spaced spring arms, with one of said spring arms acting on the control nut and the other of said spring arms acting on the second nut means.

22. The device of claim 21 wherein a direct reading counter mechanism is secured to said spring frame and is connected to the spindle for indicating the micrometer measurement.

23. The device of claim 22 wherein said spring frame comprises said first end plate, a second end plate parallel to said first end plate and a connecting plate, said counter mechanism is secured to said connecting plate, said second end plate has an opening, and the spindle extends through the opening to position the counter mechanism within the frame.

24. The device of claim 19 wherein said control nut and said second nut means each have a groove perpendicular to the axis of the spindle and said biasing means is a U-shaped spring having a first spring leg seated in the groove of the control nut and a second spring seated in the groove of the second nut means.

25. The device of claim 1 wherein said second nut means comprises first and second quarter nuts each having a groove perpendicular to the axis of the spindle, and said biasing means comprise a flat leaf spring having a bifurcated end to provide two spring arms, one of which is seated in the groove of said first quarter nut and the other of which is seated in the groove of said second quarter nut.

26. The device of claim 1 including a magazine mounted within the frame and having a tape provided with indicating measurements.

27. The device of claim 26 wherein the tape is wound on two spaced apart spools and is a plastic film having elastic recovery to provide a spring like action in the spools.

28. The device of claim 27 wherein a magazine drive plate is rotatably mounted to said frame and has at least one radially extending slot, a rotatable member is fixed to one of the spools, and a pin extends from said member parallel to the spool axis and is engaged in said slot.

29. The device of claim 28 including a magazine control knob connected to said drive plate for rotating the drive plate and thereby turn said pin and rotatable member to adjust the position of the tape on said spools.

30. The device of claim 29 including a spindle control knob connected to the spindle for rotating it and a shaft mounted on said frame for rotatably supporting the magazine and spindle control knobs adjacent each other.

31. The device of claim 30 wherein said shaft is a spindle drive shaft extending from the threaded section of the spindle externally of the frame, said spindle control knob is secured to the spindle drive shaft, and said magazine control knob is rotatably mounted about the spindle drive shaft to enable it to be rotated without causing rotation of the spindle drive shaft and to enable the spindle drive shaft to be rotated without causing rotation of the magazine control knob.

32. A direct reading micrometer for measuring workpieces of zero to two inches comprising:
  a. a frame having a first reference means;
  b. a spindle mounted in said frame and having a threaded section of at least two inches in length;
  c. a direct reading counter mechanism connected to the spindle for indicating the micrometer measurement;
  d. a control nut extending partially around a longitudinal portion of the threaded section of said spindle and having threads mating with those of the spindle;
  e. means for positioning the control nut at a set longitudinal distance from the first reference means, and
  f. resilient force applying means acting transverse to the axis of said spindle for continuously urging the mating threads of the spindle and nut into tight engagement with each other to maintain the roots and crests of the threads of the spindle in continuous alignment with the roots and crests of the control nut and provide for accurate readings of the micrometer, the resilient force applying means comprising a floating second nut means, spaced from non-engaging with, and opposing said control nut and having threads mating with those of the threaded section of the spindle, and a biasing means engaged with said second nut means for urging said second nut means against said spindle.

33. The micrometer of claim 32 wherein said biasing means is a coil spring.

34. The micrometer of claim 33 including a magazine mounted within the frame and having a tape provided with indicating measurements.

35. The micrometer of claim 34 wherein a spindle drive shaft extends from the threaded section of the spindle externally of the frame, a spindle control knob is secured to the spindle drive shaft for rotating the spindle, and a magazine control knob is connected to the magazine for adjusting the position of the tape and is rotatably mounted about the spindle drive shaft to enable it to be rotated without causing rotation of the spindle drive shaft and to enable the spindle drive shaft to be rotated without causing rotation of the magazine control knob.

36. The micrometer of claim 35 wherein the tape is wound on two spaced apart spools, a magazine drive plate is rotatably mounted to said frame, and has at least one radially extending slot, a rotatable member is fixed to one of the spools, and a pin extends from said member parallel to the spool axis and is engaged in said slot, and said magazine control knob is connected to said drive plate for rotating the drive plate and thereby turn said pin and rotatable member to adjust the position of the tape on said spools.

37. The micrometer of claim 36 wherein said tape is a plastic film having elastic recovery to provide a spring like action on the spools.

38. The device of claim 1 wherein said biasing means is a coil spring.

39. The device of claim 38 wherein said second nut means has a recess and one end of said coil spring is seated in said recess.

40. The device of claim 26 wherein a first rotatable member is attached to one of said spools, a second rotatable member is attached to the other of said spools, and a connecting means connects said rotatable members to transmit rotary motion from said first rotatable member to said second rotatable member and thereby drive said spools.

41. The device of claim 40 wherein a magazine drive plate is rotatably mounted to said frame and has at least one radially extending slot, and a pin extends parallel to the spool axes from one of said connecting means and rotatable members and is engaged in said slot.

42. The micrometer of claim 34 wherein the tape is wound on two spaced apart spools and is a plastic film having elastic recovery to provide a spring like action in the spools.

43. The micrometer of claim 42 wherein a first rotatable member is attached to one of said spools a second rotatable member is attached to the other of said spools, and a connecting means connects said rotatable members to transmit rotary motion from said first rotatable member to said second rotatable member and thereby drive said spools.

44. The micrometer of claim 43 wherein a magazine drive plate is rotatably mounted to said frame and has at least one radially extending slot, and a pin extends parallel to the spool axes from one of said connecting means and rotatable members and is engaged in said slot.

45. The micrometer of claim 33 wherein said second nut means has a recess and one end of said coil spring is seated in said recess.

46. The micrometer of claim 45 wherein the other end of said coil spring is connected to an adjusting means for adjusting the tension of said spring.

47. The micrometer of claim 46 wherein the axis of said coil spring is substantially perpendicular to the axis of said spindle.

48. The micrometer of claim 39 wherein the other end of said coil spring is connected to an adjusting means for adjusting the tension of said spring.

49. The micrometer of claim 48 wherein the axis of said coil spring is substantially perpendicular to the axis of said spindle.

* * * * *

UNITED STATES PATENT OFFICE
CERTIFICATE OF CORRECTION

Patent No. 3,810,310                 Dated May 14th, 1974

Inventor(s) Paul A. Morgan

It is certified that error appears in the above-identified patent and that said Letters Patent are hereby corrected as shown below:

Column 22, line 39, change "provided" to --provide--.

Signed and sealed this 24th day of September 1974.

(SEAL)
Attest:

McCOY M. GIBSON JR.                C. MARSHALL DANN
Attesting Officer                  Commissioner of Patents